United States Patent
Tamai et al.

(10) Patent No.: US 9,487,666 B2
(45) Date of Patent: Nov. 8, 2016

(54) INKJET RECORDING INK, INK CARTRIDGE, INKJET RECORDING METHOD, AND INKJET RECORDING APPARATUS

(71) Applicants: Takashi Tamai, Kanagawa (JP); Michihiko Namba, Kanagawa (JP); Akihiko Gotoh, Kanagawa (JP)

(72) Inventors: Takashi Tamai, Kanagawa (JP); Michihiko Namba, Kanagawa (JP); Akihiko Gotoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/898,681

(22) PCT Filed: Jul. 4, 2014

(86) PCT No.: PCT/JP2014/068521
§ 371 (c)(1),
(2) Date: Dec. 15, 2015

(87) PCT Pub. No.: WO2015/002325
PCT Pub. Date: Jan. 8, 2015

(65) Prior Publication Data
US 2016/0137862 A1 May 19, 2016

(30) Foreign Application Priority Data

Jul. 4, 2013 (JP) .................................. 2013-140264
Mar. 17, 2014 (JP) .................................. 2014-053336
Apr. 3, 2014 (JP) .................................. 2014-077009

(51) Int. Cl.
*C09D 11/38* (2014.01)
*C09D 11/322* (2014.01)

(52) U.S. Cl.
CPC ............ *C09D 11/38* (2013.01); *C09D 11/322* (2013.01)

(58) Field of Classification Search
CPC ...................................................... C09D 11/38
See application file for complete search history.

(56) References Cited

U.S. PATENT DOCUMENTS

| | | | |
|---|---|---|---|
| 7,094,813 | B2 | 8/2006 | Namba et al. |
| 7,682,011 | B2 | 3/2010 | Namba et al. |
| 7,699,457 | B2 | 4/2010 | Namba et al. |
| 7,892,340 | B2 | 2/2011 | Namba et al. |
| 8,252,207 | B2 | 8/2012 | Namba et al. |
| 8,444,755 | B2 | 5/2013 | Namba et al. |

(Continued)

FOREIGN PATENT DOCUMENTS

| | | |
|---|---|---|
| JP | 2007-119574 | 5/2007 |
| JP | 2007-253616 | 10/2007 |

(Continued)

OTHER PUBLICATIONS

International Search Report Issued Oct. 14, 2014 for counterpart International Patent Application No. PCT/JP2014/068521 filed Jul. 4, 2014.

(Continued)

*Primary Examiner* — Justin Seo
*Assistant Examiner* — Roger W Pisha, II
(74) *Attorney, Agent, or Firm* — Oblon, McClelland, Maier & Neustadt, L.L.P.

(57) ABSTRACT

An inkjet recording ink, including: water; a water-soluble organic solvent; a colorant; a compound containing a group expressed by the following Structural Formula (1), and a defoamer, $C_6F_{13}$—$CH_2CH_2$— Structural Formula (1).

15 Claims, 3 Drawing Sheets

(56) References Cited

U.S. PATENT DOCUMENTS

| | | |
|---|---|---|
| 2002/0096085 A1 | 7/2002 | Gotoh et al. |
| 2003/0076394 A1 | 4/2003 | Gotoh et al. |
| 2009/0041940 A1 | 2/2009 | Yokohama et al. |
| 2010/0112219 A1* | 5/2010 | Yokohama ............ C09D 11/38 427/256 |
| 2010/0302326 A1 | 12/2010 | Morohoshi et al. |
| 2011/0021023 A1 | 1/2011 | Letize et al. |
| 2011/0216123 A1 | 9/2011 | Tamai et al. |
| 2011/0300353 A1 | 12/2011 | Habashi et al. |
| 2011/0310166 A1 | 12/2011 | Namba et al. |
| 2012/0026257 A1 | 2/2012 | Robertson et al. |
| 2012/0236066 A1 | 9/2012 | Tamai et al. |
| 2012/0320133 A1 | 12/2012 | Namba et al. |
| 2013/0113860 A1 | 5/2013 | Gotou et al. |
| 2014/0002539 A1 | 1/2014 | Goto et al. |
| 2015/0307729 A1 | 10/2015 | Gotou et al. |

FOREIGN PATENT DOCUMENTS

| | | |
|---|---|---|
| JP | 2008-184567 | 8/2008 |
| JP | 2010-106141 | 5/2010 |
| JP | 2010-275377 | 12/2010 |
| JP | 2012-207202 | 10/2012 |
| JP | 2012-241135 | 12/2012 |
| JP | 2013-500603 | 1/2013 |
| WO | WO 2012/018098 | 2/2012 |

OTHER PUBLICATIONS

European Search Report issued Jun. 30, 2016, in corresponding European Patent Application No. EP 14 81 9765.

* cited by examiner

INKJET RECORDING INK, INK CARTRIDGE, INKJET RECORDING METHOD, AND INKJET RECORDING APPARATUS

TECHNICAL FIELD

The present invention relates to an inkjet recording ink, an ink cartridge, an inkjet recording method, and an inkjet recording apparatus.

BACKGROUND ART

When a pigment is used in an inkjet recording ink as a colorant, use of an ordinary hydrocarbon surfactant makes it difficult to accomplish an equivalent level with a dye ink in homogeneity of a solid image portion and color developing of a color image. Therefore, it has already been known that use of a fluorochemical surfactant reduces surface tension of ink and enhances homogeneity in the solid image portion, being able to attain improvement in color developing.

However, some conventional fluorochemical surfactants give load to the environmental load although they can form high-quality images, others cannot form high-quality images although they do not give much load to the environment. There is a problem that reduction of environmental load and improvement of image quality are difficult to attain at the same time, and further, bubbles are difficult to disappear.

Under such circumstances, an inkjet recording ink containing a specific fluorochemical surfactant and a foam inhibitor has been proposed in order to perform formation of high-quality images on plain paper (refer to PTL 1).

Although this proposed technique enables reduction of environmental load brought by the fluorochemical surfactant, sufficient effects are not be obtained in terms of formation of high-quality images (high color developing property). At present, there is still difficulty in attaining reduction of environmental load and improvement in image quality at the same time.

CITATION LIST

Patent Literature

PTL 1: Japanese Patent Application Laid-Open (JP-A) No. 2010-275377

SUMMARY OF INVENTION

Technical Problem

The present invention aims to provide an inkjet recording ink that does not give much load to the environment, has high defoaming property, and can improve image quality.

Solution to Problem

An inkjet recording ink of the present invention as a means for solving the above problems includes water, a water-soluble organic solvent, a colorant, a compound containing a group expressed by the following Structural Formula (1), and a defoamer:

$$C_6F_{13}-CH_2CH_2- \quad \text{Structural Formula (1).}$$

Advantageous Effects of Invention

According to the present invention, it is possible to provide an inkjet recording ink that does not give much load to the environment, has high defoaming property, and can improve image quality, the inkjet recording ink capable of solving the above existing problems.

Figure 1:
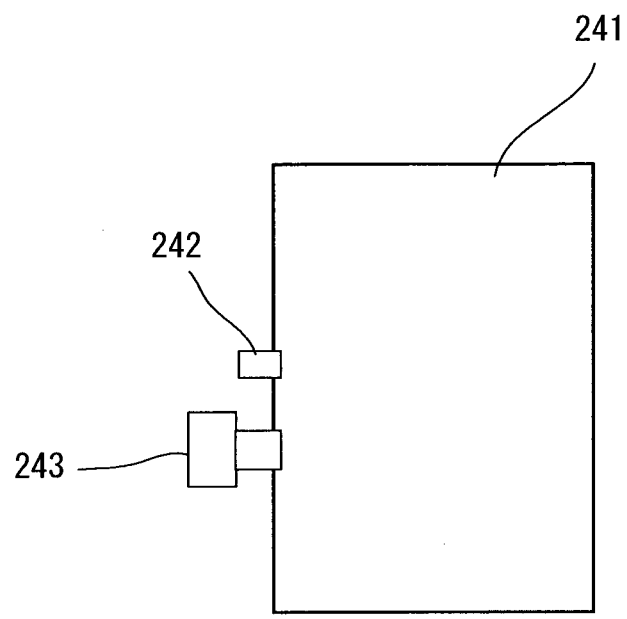
FIG. 1 is a schematic diagram of one example of an ink cartridge of the present invention.

DESCRIPTION OF EMBODIMENTS (Inkjet Recording Ink)
An inkjet recording ink of the present invention includes water, a water-soluble organic solvent, a colorant, a compound containing a group expressed by the following Structural Formula (1), and a defoamer: $C_6F_{13}-CH_2CH_2-$ . . . Structural Formula (1); and further includes other ingredients, if necessary.

The compound containing a group expressed by the following Structural Formula (1) is preferably a compound represented by the following General Formula (1):

$$C_6F_{13}-CH_2CH_2O(CH_2CH_2O)_nH \quad \text{General Formula (1)}$$

where in General Formula (1), n is a natural number of 1 to 40.

The present invention can provide an ink which can attain reduction of environmental load and improvement of image quality (in particular, high color developing property) by using in combination the compound containing a group containing the specific structure and the defoamer. The present invention can inhibit discharge instability resulting from a property of the fluorochemical surfactant that easily foams.

By incorporating the compound containing a group expressed by Structural Formula (1) in the ink in the specific proportion, the resultant ink is high in concentration but low in surface tension. In printing on plain paper, in addition to the features of conventional inks: a vehicle quickly infiltrates into paper so that a colorant is easier to remain on the paper surface, use of the compound containing a group expressed by Structural Formula (1) further prevents localization of the colorant, so that the colorant uniformly exists on the paper surface to remarkably improve uniform dyeability. As a result, it is possible to obtain an image having low strike-through as well as high saturation and high color-developing density. Discharge instability due to high foaming property which is characteristic of the fluorochemical surfactant can be prevented by the addition of the defoamer.

Note that, the fluorochemical surfactant represented by the following General Formula (A) (ZONYL FS-300, product of DuPont Co.) has a perfluoroalkyl group having 8 carbon atoms, and PFOA (perfluorooctanoic acid) is generated as a by-product in its production process. PFOA is reported to be carcinogenic.

$$C_8F_{17}-CH_2CH_2O(CH_2CH_2O)xH \quad \text{General Formula (A)}$$

Note that, x is 1 to 40 in General Formula (A).
In contrast, since the compound containing a group expressed by Structural Formula (1) has a perfluoroalkyl group having 6 carbon atoms, PFOA is not generated as a by-product in its synthesis, which leads to reduction of environmental load.

<Compound Containing a Group Expressed by Structural Formula (1)>

The compound containing a group expressed by Structural Formula (1) can improve image quality (e.g., high color developing property) and give wettability to member by reducing the surface tension.

The compound containing a group expressed by Structural Formula (1) is preferably a compound represented by the following General Formula (1).

$C_6F_{13}-CH_2CH_2O(CH_2CH_2O)_nH$     General Formula (1)

In General Formula (1), n is preferably a natural number of from 1 to 40, more preferably from 5 to 30.

The perfluoroalkyl group $C_6F_{13}$ in General Formula (1) is preferably a straight chain from the viewpoint of wettability of the members.

The compound represented by General Formula (1) used may be a compound synthesized appropriately, or a commercially available product.

Examples of the compound represented by General Formula (1) include: compounds represented by General Formula (1) where n is 7 to 17; compounds represented by General Formula (1) where n is 25 to 35; compounds represented by General Formula (1) where n is 7 to 17 and 25 to 35; compounds represented by General Formula (1) where n is 5 to 20; and compounds represented by General Formula (1) where n is 6 to 22. These compounds may be used alone, or two or more kinds of them may be used in combination. Among these, compounds represented by General Formula (1) where n is 6 to 22; compounds represented by General Formula (1) where n is 5 to 20; and compounds represented by General Formula (1) where n is 7 to 17 and 25 to 35 are particularly preferred.

Examples of the commercially available product include CAPSTONE (registered trademark) FS-30 (which is represented by General Formula (1) where n is 6 to 22; product of DuPont Co.), CAPSTONE (registered trademark) FS-34 (which is represented by General Formula (1) where n is 5 to 20; product of DuPont Co.), and CAPSTONE (registered trademark) FS-3100 (which is represented by General Formula (1) where n is 7 to 17 and 25 to 35; product of DuPont Co.). These may be used alone, or two or more kinds of them may be used in combination.

Other surfactants may be used in combination with the compound containing a group expressed by Structural Formula (1). In this case, an amount of the compound containing a group expressed by Structural Formula (1) is preferably 60% by mass or more relative to the total amount of the compound containing a group expressed by Structural Formula (1) and the other surfactants.

The other surfactants are not particularly limited and may be appropriately selected depending on the intended purpose. Examples of the other surfactants include nonionic surfactants, anionic surfactants, acetylene glycol surfactants, fluorochemical surfactants, and amphoteric surfactants.

Examples of the nonionic surfactant include MARPO-MARSE PT (product of Matsumoto Yushi-Seiyaku Co., Ltd.).

Examples of the anionic surfactant include ECTD-3NEX (product of NIKKO CHEMICALS Co., Ltd.).

Examples of the acetylene glycol surfactant include SUR-FYNOL 104PA (product of Air Products Japan Co., Ltd.).

Examples of the fluorine surfactant include ZONYL FS-300, FSN, FSN-100, FSO, FSO-100, and FSH (these products are of DuPont Co.) and DSN-403N (product of DAIKIN INDUSTRIES. Co., Ltd.).

An amount of the compound containing a group expressed by Structural Formula (1) is not particularly limited and may be appropriately selected depending on the intended purpose. The amount thereof is preferably 0.04% by mass to 1.5% by mass, more preferably 0.05% by mass to 1% by mass, particularly more preferably 0.1% by mass to 0.5% by mass, relative to the total amount of the inkjet recording ink. Within the preferable numerical ranges, the surface tension of the inkjet recording ink is reduced, so that the vehicle can be made infiltrate quickly to leave the colorant on the paper.

When the amount of the compound containing a group expressed by Structural Formula (1) is 0.04% by mass or more, the inkjet recording ink can give results of high color developing property. When the amount thereof is 1.5% by mass or less, the inkjet recording ink can give good storage stability.

<Defoamer>

The defoamer can enhance defoaming property, can prevent generation of foam when the ink is filled or discharged, and makes generated foam disappear quickly.

In the present invention, whether a defoamer is the defoamer used in the present invention can be judged as follows.

Specifically, an aqueous solution containing 0.5% by mass of an evaluation sample, 1% by mass of a surfactant (CAPSTONE FS-30, product of DuPont Co.), 10% by mass of 1,3-butanediol, 10% by mass of glycerin, 2% by mass of octanediol, and water as balance (total: 100% by mass) are prepared. Next, 10 g of the aqueous solution is added to a 100 mL measuring cylinder. Air is sprayed to the aqueous solution to bubble it until generated foam reaches a height of 100 mL in the measuring cylinder. Then, the resultant is left to stand. In the case where the generated foam disappears within 600 seconds, it can be judged that the evaluation sample is the defoamer. In the case where the generated foam remains for over 600 seconds, it can be judged that the evaluation sample is not the defoamer.

The defoamer is not particularly limited and may be appropriately selected depending on the intended purpose. Examples of the defoamer include silicone defoamers and foam destroying polymer defoamers. Among these, silicone defoamers are preferred.

Examples of the silicone defoamer include oil-type silicone defoamers, compound-type silicone defoamers, self-emulsifiable-type silicone defoamers, emulsion-type silicone defoamers, and modified silicone defoamers.

Examples of the modified silicone defoamer include amino-modified silicone defoamers, carbinol-modified silicone defoamers, methacryl-modified silicone defoamers, polyether-modified silicone defoamers, alkyl-modified silicone defoamers, higher fatty acid ester-modified silicone defoamers, and alkylene oxide-modified silicone defoamers. Among these, self-emulsifiable-type silicone defoamers and emulsion-type silicone defoamers are preferred in consideration of use for the inkjet recording ink which is an aqueous medium.

The defoamer may be a commercially available product. Examples of the commercially available product include silicone defoamers KS508, KS531, KM72, KM72F, KM85, and KM98 and the like (these products are of Shin-Etsu Silicone Co., Ltd.), silicone defoamers Q2-3183A, SH5500, SH5510, SM5512, and SM5571 EMULSION and the like (these products are of Dow Corning Toray Co.), silicone defoamers SAG30 and the like (these products are of Nippon Unicar Co., Ltd.), defoamers ADEKANATE series (these products are of ADEKA Co., Ltd.), and foam destroying polymer defoamers such as BYK-1790 (product of BYK Chemie Japan KK). These commercially available products may be used alone, or two or more kinds of them may be used in combination.

An amount of the defoamer is not particularly limited and may be appropriately selected depending on the intended purpose. The amount thereof is preferably 0.03% by mass to 0.6% by mass, more preferably 0.05% by mass to 0.5% by mass, particularly preferably 0.075% by mass to 0.15% by mass, relative to the total amount of the inkjet recording ink. When the amount of the defoamer is 0.03% by mass or more, preferable defoaming effects are obtained. When the amount of the defoamer is 0.6% by mass or less, bending of the discharged ink and no discharge of the ink do not arise, and clogging of the ink channel and the resultant prevention of ink supply do not arise.

<Water>

The water is not particularly limited and may be appropriately selected depending on the intended purpose. Examples of the water include ultrapure water and pure water such as ion-exchange water, ultrafiltration water, reverse osmosis water, and distilled water. The water may be used alone or two or more kinds of them may be used in combination.

<Water-Soluble Organic Solvent>

The water-soluble organic solvent is contained in the ink to enhance prevention of drying and dispersion stability of the ink.

The water-soluble organic solvent is not particularly limited and may be appropriately selected depending on the intended purpose. Examples of the water-soluble organic solvent include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, and other organic solvents. These water-soluble organic solvents may be used alone, or two or more kinds of them may be used in combination. Note that, the water-soluble organic solvents may be referred to as a humectant.

Examples of the polyhydric alcohol include glycerin, diethylene glycol, 1,3-butanediol, 3-methyl-1,3-butanediol, 3-methyl-1,5-pentanediol, triethylene glycol, propylene glycol, dipropylene glycol, trimethylolethane, trimethylolpropane, ethylene glycol, tripropylene glycol, tetraethylene glycol, hexylene glycol, polyethylene glycol, polypropylene glycol, 1,5-pentanediol, 1,6-hexanediol, 1,2,6-hexanetriol, 1,2,4-butanetriol, 1,2,3-butanetriol, and 3-methyl-1,3,5-pentanetriol.

Examples of the polyhydric alcohol alkyl ether include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ether include ethylene glycol monophenyl ether and ethylene glycol monobenzyl ether.

Examples of the nitrogen-containing heterocyclic compound include 2-pyrrolidone, N-methyl-2-pyrrolidone, N-hydroxyethyl-2-pyrrolidone, 1,3-dimethylimidazolidinone, ε-caprolactam, and γ-butyrolactone.

Examples of the amide include formamide, N-methylformamide, and N,N-dimethylformamide.

Examples of the amine include monoethanolamine, diethanolamine, triethanolamine, monoethylamine, diethylamine, and triethylamine.

Examples of the sulfur-containing compound include dimethyl sulfoxide, sulfolane, and thiodiethanol.

The other organic solvents include saccharides. Examples of the saccharide include monosaccharides, disaccharides, oligosaccharides (including trisaccharides and tatrasaccharides), and polysaccharides.

Examples of the monosaccharide, disaccharide, and oligosaccharide (including trisaccharides and tatrasaccharides) include glucose, mannose, fructose, ribose, xylose, arabinose, galactose, maltose, cellobiose, lactose, sucrose, trehalose, and maltotriose.

The polysaccharide means sugars in a broad sense, and examples thereof include α-cyclodextrin and cellulose.

Examples of derivatives of the saccharides include reducing sugars of the saccharides [sugar alcohols represented by General Formula: $HOCH_2(CHOH)_nCH_2OH$ (n=an integer of from 2 to 5)], oxidized sugars (e.g., aldonic acid and uronic acid), amino acids and thio acids. Among these, sugar alcohols are particularly preferred.

Examples of the sugar alcohol include maltitol, sorbitol, and xylitol.

Among the water-soluble organic solvents, from the viewpoints of storage stability and discharge stability of the inkjet recording ink, glycerin, hexylene glycol, diethylene glycol, triethylene glycol, propylene glycol, dipropylene glycol, 1,3-butanediol, 2-ethyl-1,3-hexanediol, 3-methyl-1,3-butanediol, 3-methyl-1,5-pentanediol, 1,5-pentanediol, 1,6-hexanediol, trimethylolpropane, tetramethylolpropane, D-sorbitol, xylitol, and 2-pyrrolidone are preferred, and 1,3-butanediol, glycerin, 2-ethyl-1,3-hexanediol, 3-methyl-1,3-butanediol, hexylene glycol, 3-methyl-1,5-pentanediol, 2-pyrrolidone, 1,5-pentanediol, and 1,6-hexanediol are more preferred.

An amount of the water-soluble organic solvent is not particularly limited and may be appropriately selected depending on the intended purpose. The amount thereof is preferably 10% by mass to 50% by mass, more preferably 15% by mass to 40%, relative to the total amount of the inkjet recording ink. Within the preferable numerical ranges, the ink gives quite good results of drying property, storage stability, and reliability.

In the case of a pigment ink, a ratio of the pigment to the water-soluble organic solvent greatly influences discharge stability of the inkjet recording ink from a recording head. When a ratio of the solid content of the pigment is high but an amount of the water-soluble organic solvents is low, moisture evaporation advances around ink meniscus of a nozzle, which brings about discharging failure.

<Colorant>

Dyes or pigments may be used as the colorant; however, from the viewpoint of water resistance and lightfastness of an ink recording matter, a pigment is preferably used. The kind of the pigment is not particularly limited and may be appropriately selected depending on the intended purpose. It is, for example, an organic pigment or an inorganic pigment. These pigments may be used alone or two or more kinds of them may be used in combination.

Examples of the organic pigment include azo pigments, phthalocyanine pigments, anthroquinone pigments, dioxazine pigments, indigo pigments, thioindigo pigments, perylene pigments, isoindolenone pigments, aniline black, azomethine pigments, and Rhodamine B Lake pigments.

Examples of the inorganic pigment include carbon black, iron oxide, titanium oxide, calcium carbonate, barium sulfate, aluminum hydroxide, barium yellow, iron blue, cadmium red, chrome yellow, and metal powder.

Examples of a black pigment include carbon black (C.I. pigment black 7) such as furnace black, lamp black, acetylene black, and channel black; metals such as copper oxide, iron oxide (C.I. pigment black 11), and titanium oxide; and organic pigments such as aniline black (C.I. pigment black 1).

Examples of a yellow pigment include C.I. pigment yellow 1 (fast yellow G), 2, 3, 12 (disazo yellow AAA), 13, 14, 16, 17, 20, 23, 24, 34, 35, 37, 42 (yellow iron oxides), 53, 55, 73, 74, 75, 81, 83 (disazo yellow HR), 86, 93, 95, 97, 98, 100, 101, 104, 108, 109, 110, 114, 117, 120, 125, 128, 129, 137, 138, 139, 147, 148, 150, 151, 153, 154, 155, 166, 168, 180, and 185.

Examples of a magenta pigment include C.I. pigment violet 19, C.I. pigment red 1, 2, 3, 5, 7, 9, 12, 17, 22 (brilliant fast scarlet), 23, 31, 38, 48:1 [permanent red 2B (Ba)], 48:2 [permanent red 2B (Ca)], 48:3 [permanent red 2B (Sr)], 48:4 [permanent red 2B (Mn)], 49:1, 52:2, 53:1, 57:1 (brilliant carmine 6B), 60:1, 63:1, 63:2, 64:1, 81 (Rhodamine 6G Lake), 83, 88, 92, 97, 101 (red oxide), 104, 105, 106, 108 (cadmium red), 112, 114, 122 (dimethylquinacridone), 123, 146, 149, 166, 168, 170, 172, 175, 176, 178, 179, 180, 184, 185, 190, 192, 193, 202, 209, 215, 216, 217, 219, 220, 223, 226, 227, 228, 238, 240, 254, 255, and 272.

Examples of a cyan pigment include C.I. pigment blue 1, 2, 3, 15 (copper phthalocyanine blue R), 15:1, 15:2, 15:3 (phthalocyanine G), 15:4, 15:6 (phthalocyanine E), 16, 17:1, 22, 56, 60, 63, 64, Vat Blue 4, and Vat Blue 60.

Examples of a pigment having an intermediate color include C.I. Pigment Red 177, 194, 224, C.I. Pigment Orange 16, 36, 43, 51, 55, 59, 61, 71, C.I. Pigment Violet 3, 19, 23, 29, 30, 37, 40, 50, C.I. Pigment Green 7, and 36, which are used for red, green and blue.

An amount of the pigment is not particularly limited and may be appropriately selected depending on the intended purpose. The amount thereof is preferably 2% by mass to 15% by mass relative to the total amount of the inkjet recording ink.

<Other Components>

The other components are not particularly limited and may be appropriately selected depending on the intended purpose. Examples thereof include pH adjusters, antiseptic/antifungal agents, chelating reagents, antirust agents, antioxidants, UV absorbers, oxygen absorbers and light stabilizers.

The pH adjuster is not particularly limited and may be appropriately selected depending on the intended purpose, as long as it can adjust the pH without having an adverse effect on properties of an inkjet recording ink. Examples thereof include: amines such as diethanolamine and triethanolamine; hydroxides of alkali metal elements such as lithium hydroxide, sodium hydroxide, and potassium hydroxide; ammonium hydroxides; quaternary ammonium hydroxides; quaternary phosphonium hydroxides; carbonates of alkali metals such as lithium carbonate, sodium carbonate, and potassium carbonate; and aminopropanediol derivatives. Among them, aminopropanediol compounds are particularly preferred.

Examples of the aminopropanediol compound include 1-amino-2,3-propanediol, 1-methylamino-2,3-propanediol, 2-amino-2-methyl-1,3-propanediol, and 2-amino-2-ethyl-1,3-propanediol.

—Antiseptic/Antifungal Agent—

Examples of the antiseptic/antifungal agent include sodium dehydroacetate, sodium sorbate, sodium 2-pyridinethiol-1-oxide, sodium benzoate, and sodium pentachlorophenol.

—Chelating Reagent—

Examples of the chelating reagent include sodium ethylenediamine tetraacetate, sodium nitrilotriacetate, sodium hydroxyethylethylenediamine triacetate, sodium diethylenetriamine pentaacetate, and sodium uramil diacetate.

—Antirust Agent—

Examples of the antirust agent include acid sulfites, sodium thiosulfate, ammonium thiodiglycolate, diisopropylammonium nitrate, pentaerythritol tetranitrate and dicyclohexylammonium nitrate.

—Antioxidant—

Examples of the antioxidant include phenolic antioxidants (including hindered phenol antioxidants), amine antioxidants, sulfur antioxidants and phosphorus antioxidants.

Examples of the phenolic antioxidants (including hindered phenol antioxidants) include butylated hydroxyanisole,
2,6-di-tert-butyl-4-ethylphenol,
stearyl-β-(3,5-di-tert-butyl-4-hydroxyphenyl)propionate,
2,2'-methylenebis(4-methyl-6-tert-butylphenol),
2,2'-methylenebis(4-ethyl-6-tert-butylphenol),
4,4'-butylidenebis(3-methyl-6-tert-butylphenol),
3,9-bis[1,1-dimethyl-2-[β-(3-tert-butyl-4-hydroxy-5-methylphenyl)propionyloxy]ethyl]-2,4,8,10-tetraoxaspiro[5.5] undecane,
1,1,3-tris(2-methyl-4-hydroxy-5-tert-butylphenyl)butane,
1,3,5-trimethyl-2,4,6-tris(3,5-di-tert-butyl-4-hydroxybenzyl)benzene and
tetrakis[methylene-3-(3',5'-di-tert-butyl-4'-hydroxyphenyl) propionate]methane.

Examples of the amine antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butyl hydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate]methane and 1,1,3-tris(2-methyl-4-hydroxy-5-tert-butylphenyl)butane.

Examples of the sulfur antioxidants include dilauryl 3,3'-thiodipropionate, distearyl thiodipropionate, lauryl stearyl thiodipropionate, dimyristyl-3,3'-thiodipropionate, distearyl β,β'-thiodipropionate, 2-mercaptobenzimidazole and dilauryl sulfide.

Examples of the phosphorus antioxidants include triphenyl phosphite, octadecyl phosphite, triisodecyl phosphite, trilauryl trithiophosphite and trinonylphenyl phosphite.

—UV Absorber—

Examples of the UV absorber include benzophenone UV absorbers, benzotriazole UV absorbers, salicylate UV absorbers, cyanoacrylate UV absorbers and nickel complex salt UV absorbers.

Examples of the benzophenone UV absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone and 2,2',4,4'-tetrahydroxybenzophenone.

Examples of the benzotriazole UV absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole and 2-(2'-hydroxy-3'-tert-butyl-5'-methylphenyl)-5-chlorobenzotriazole.

Examples of the salicylate UV absorbers include phenyl salicylate, p-tert-butylphenyl salicylate and p-octylphenyl salicylate.

Examples of the cyanoacrylate UV absorbers include ethyl-2-cyano-3,3'-diphenyl acrylate, methyl-2-cyano-3-methyl-3-(p-methoxyphenyl) acrylate and butyl-2-cyano-3-methyl-3-(p-methoxyphenyl) acrylate.

Examples of the nickel complex salt UV absorbers include nickel bis(octylphenyl) sulfide, 2,2'-thiobis(4-tert-octylphelate)-n-butylamine nickel(II), 2,2'-thiobis(4-tert-octylphelate)-2-ethylhexylamine nickel(II) and 2,2'-thiobis(4-tert-octylphelate)triethanolamine nickel(II).

The inkjet recording ink of the present invention is not particularly limited and can be produced by any known method. For example, the colorant, the compound containing a group expressed by Structural Formula (1) (fluorochemical surfactant), the water, the water-soluble organic solvent, the defoamer, and optionally-used other components are stirred and mixed together using, for example, a sand mill, a ball mill, a roll mill, a bead mill, a nonomizer, a homogenizer, or an ultrasonic dispersing device, and the resultant mixture is subjected to filtration to remove coarse particles using a filter or a centrifugal separation device, and to optional degassing, to thereby produce the inkjet recording ink of the present invention. The stirring and mixing can be performed with, for example, an ordinary stirrer using stirring blades, a magnetic stirrer, or a high-speed dispersing device.

The coloring of the inkjet recording ink of the present invention is not particularly limited and may be appropriately selected depending on the intended purpose. For instance, the inkjet recording ink is colored yellow, magenta, cyan or black. When recording is performed using an ink set in which two or more of the colors are used together, it is possible to form a multicolor image, and when recording is performed using an ink set in which all the colors are used together, it is possible to form a full-color image.

The properties of the inkjet recording ink of the present invention are not particularly limited and may be appropriately selected depending on the intended purpose. For example, it is desirable that the surface tension and the pH of the inkjet recording ink be in the following ranges.

The surface tension of the inkjet recording ink is preferably 25 mN/m to 55 mN/m at 20° C. When the surface tension thereof is 25 mN/m or more, stable jetting can be attained without causing bleeding on a recording medium. Whereas when it is 55 mN/m or less, the ink sufficiently penetrates into a recording medium, and can be dried in a short period of time.

The pH of the inkjet recording ink is preferably 7 to 10, for example.

The inkjet recording ink of the present invention can be suitably used in various fields; e.g., it can be suitably used in image-forming apparatuses (e.g., printers) employing an inkjet recording method. For example, the inkjet recording ink can be used in a printer which has a function of encouraging printing fixing by heating a recording medium and the inkjet recording ink to a temperature of 50° C. to 200° C. during, before or after printing. The inkjet recording ink can be particularly suitably used in an ink cartridge, an inkjet recording apparatus, and an inkjet recording method of the present invention which will be described below.

(Ink Cartridge)

An ink cartridge of the present invention includes the inkjet recording ink of the present invention, and a container which houses the inkjet recording ink of the present invention; and further includes other members appropriately selected in accordance with necessity.

The container is not particularly limited and the shape, structure, size, and material thereof may be appropriately selected depending on the intended purpose. Suitable examples thereof include a container having at least an ink bag formed of, for example, an aluminum laminated film or a resin film.

Next, the ink cartridge will be described with reference to FIGS. 1 and 2. Here, FIG. 1 is a diagram of one example of the ink cartridge of the present invention, and FIG. 2 is a diagram of the ink cartridge of FIG. 1 with a case (outer casing) also shown.

Figure 2:
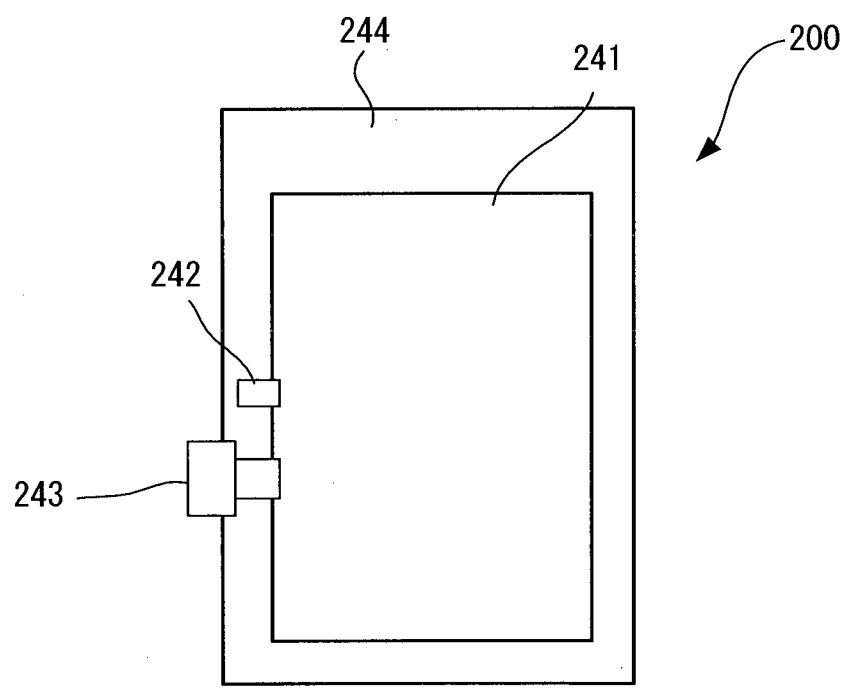
FIG. 2 is a schematic diagram of the ink cartridge of FIG. 1 with a case also shown.

In an ink cartridge 200 as shown in FIG. 1, the ink is supplied from an ink inlet 242 into an ink bag 241, and the ink inlet 242 is closed by means of fusion bonding after air has been discharged. When the ink cartridge is used, an ink ejection outlet 243 made of a rubber member is pricked with a needle of an inkjet recording apparatus main body.

The ink bag 241 is formed of an air-impermeable packing member such as an aluminum laminated film. As shown in FIG. 2, this ink bag 241 is normally housed in a plastic cartridge case 244 and detachably mounted on a variety of inkjet recording apparatuses.

The ink cartridge of the present invention houses the inkjet recording ink of the present invention and can be detachably mounted on a variety of inkjet recording apparatuses. It is particularly desirable that the ink cartridge be detachably mounted on an inkjet recording apparatus of the present invention described below.

(Inkjet Recording Apparatus and Inkjet Recording Method)

The inkjet recording apparatus of the present invention includes at least an ink jetting unit, and further includes other units appropriately selected in accordance with the necessity, such as a stimulus generating unit, a reversing unit, and a controlling unit.

The inkjet recording method used in the present invention includes at least an ink jetting step, and further includes other steps appropriately selected in accordance with the necessity, such as a stimulus generating step, a reversing step, and a controlling step.

The inkjet recording method used in the present invention can be suitably performed by the inkjet recording apparatus of the present invention, and the ink jetting step can be suitably performed by the ink jetting unit. Also, the other steps can be suitably performed by the other units.

<Ink Jetting Step and Ink Jetting Unit>

The ink jetting step is a step of applying a stimulus to the inkjet ink of the present invention to make the inkjet recording ink jet, to thereby form an image.

The ink jetting unit is a unit configured to apply a stimulus to the inkjet ink of the present invention to make the inkjet recording ink jet, to thereby form an image. The ink jetting unit is not particularly limited, and examples thereof include recording heads equipped with nozzles for ejecting ink.

In the present invention, at least part of a liquid chamber, a fluid resistance unit, a diaphragm, and a nozzle member of the recording head is preferably formed of a material containing silicon or nickel or both thereof.

Also, the diameter of the nozzle is preferably 30 μm or less, more preferably 1 μm to 20 μm.

The recording head preferably has a nozzle plate with its ink ejection surface subjected to a water repellent treatment.

The water repellent treatment is preferably one selected from PTFE-Ni codeposition, fluororesin treatment, and silicone resin treatment.

Also, the inkjet recording apparatus is preferably configured to have a subtank for supplying the inkjet recording ink to the recording head, so that the subtank is replenished with the inkjet recording ink from the ink cartridge via a supply tube.

It is desirable that the inkjet ink droplets jetted be, for example, 3 pL to 40 pL in size, 5 m/s to 20 m/s in ejection velocity, 1 kHz or greater in drive frequency, and 300 dpi or greater in resolution.

<Other Steps and Other Units>

Examples of the other steps include a stimulus generating step and a controlling step.

Examples of the other units include a stimulus generating unit and a controlling unit.

—Stimulus Generating Step and Stimulus Generating Unit—

The stimulus can, for example, be generated by the stimulus generating unit, and the stimulus is not particularly limited and may be appropriately selected depending on the intended purpose. Examples thereof include heat (temperature), pressure, vibration and light. These may be used alone or in combination. Among them, heat and pressure are suitable.

Examples of the stimulus generating unit include heaters, pressurizers, piezoelectric elements, vibration generators, ultrasonic oscillators and lights. Specific examples thereof include a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

The aspect of the jetting of the inkjet recording ink is not particularly limited and varies with, for example, the type of the stimulus. In the case where the stimulus is "heat", there is, for example, a method in which thermal energy corresponding to a recording signal is given to the recording ink in a recording head, using, for example, a thermal head, bubbles are generated in the inkjet recording ink by the thermal energy, and the inkjet recording ink is ejected as droplets from nozzle holes of the recording head by the pressure of the bubbles. Meanwhile, in the case where the stimulus is "pressure", there is, for example, a method in which by applying voltage to a piezoelectric element bonded to a site called a pressure chamber that lies in an ink flow path in a recording head, the piezoelectric element bends, the volume of the pressure chamber decreases, and thus the recording ink is ejected as droplets from nozzle holes of the recording head —Controlling Step and Controlling Unit—

The controlling step is a step of controlling operations of the aforementioned steps and can be performed by the controlling unit. The controlling unit is not particularly limited and may be appropriately selected depending on the intended purpose. Examples thereof include a sequencer and a computer.

One embodiment where the inkjet recording method used in the present invention is performed by the inkjet recording apparatus of the present invention will be described with reference to the drawings.

Figure 3:
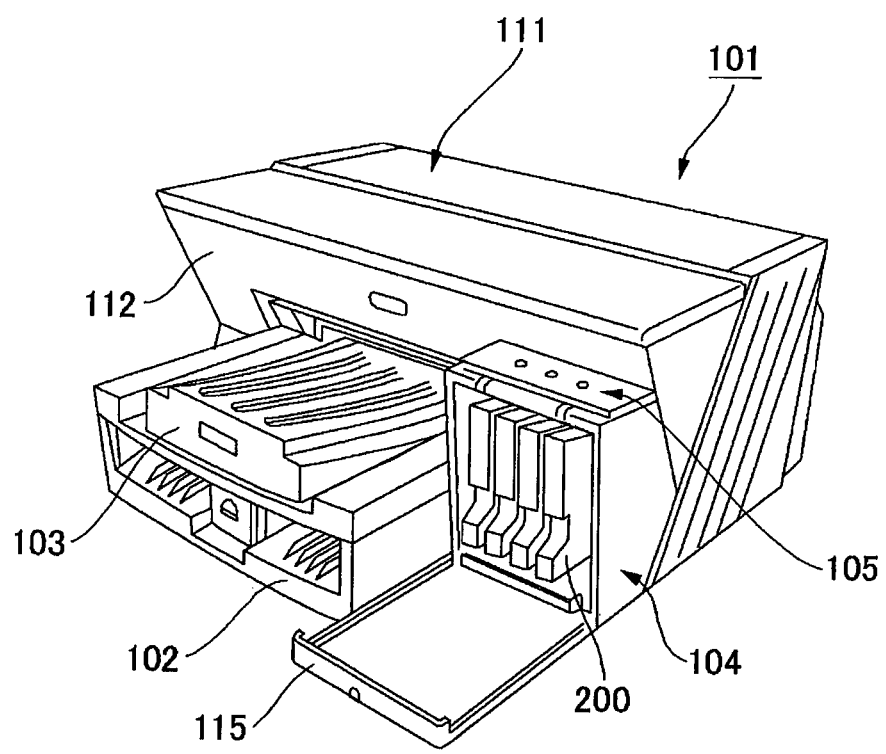
FIG. 3 is a perspective diagram of an ink cartridge loading section of an inkjet recording apparatus with its cover open.

The inkjet recording apparatus in FIG. 3 includes an apparatus main body 101, a paper feeding tray 102 for feeding paper into the apparatus main body 101, a paper discharge tray 103 for storing paper which has been fed into the apparatus main body 101 and on which images have been recorded (formed), and an ink cartridge loading section 104. An operation unit 105 composed of, for example, operation keys and a display is placed on the upper surface of the ink cartridge loading section 104. The ink cartridge loading section 104 has a front cover 115 capable of opening and closing to attach and detach the ink cartridge 200. In FIG. 3, reference numeral 111 denotes an upper cover and reference numeral 112 denotes a front surface of a front cover.

Figure 4:
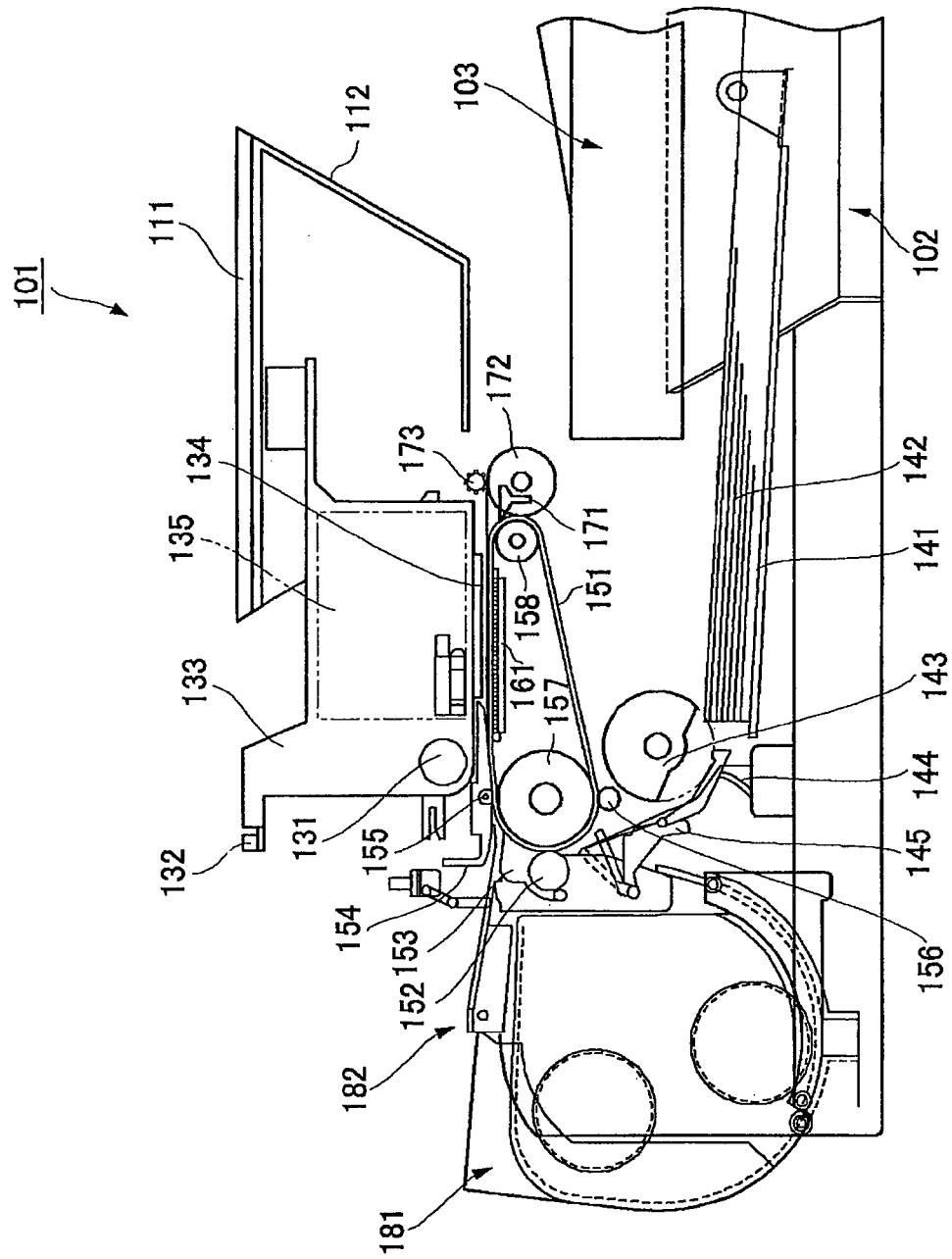
FIG. 4 is a schematic configuration diagram of an overall configuration of an inkjet recording apparatus.

In the apparatus main body 101, as shown in FIG. 4, a carriage 133 is freely slidably held in the main-scanning direction by a guide rod 131, which is a guide member laterally passed between left and right side plates (not depicted), and a stay 132; and the carriage 133 is moved for scanning by a main scanning motor (not depicted).

A recording head 134 composed of four heads which eject ink droplets of yellow (Y), cyan (C), magenta (M) and black (Bk) is installed in the carriage 133 such that a plurality of ink ejection outlets are aligned in the direction intersecting the main-scanning direction and that the ink droplet ejection direction faces downward.

For each of the heads composing the recording head 134, it is possible to use, for example, a head provided with any of the following actuators as a energy-generating unit for ejecting ink: a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

Also, the carriage 133 incorporates sub-tanks 135 of each color for supplying the inks of each color to the recording head 134. Each sub-tank 135 is supplied and replenished with the inkjet ink of the present invention from the ink cartridge 200 of the present invention loaded into the ink cartridge loading section 104, via a recording ink supply tube (not depicted).

Meanwhile, as a paper feeding unit for feeding sheets of paper 142 loaded on a paper loading section (pressurizing plate) 141 of the paper feeding tray 102, there are provided a half-moon roller [paper feeding roller 143] which feeds the sheets of paper 142 one by one from the paper loading section 141, and a separation pad 144 which faces the paper feeding roller 143 and is formed of a material with a large friction coefficient. This separation pad 144 is biased toward the paper feeding roller 143 side.

As a conveyance unit for conveying the paper 142, which has been fed from this paper feeding unit, under the recording head 134, there are provided a conveyance belt 151 for conveying the paper 142 by means of electrostatic adsorption; a counter roller 152 for conveying the paper 142, which is sent from the paper feeding unit via a guide 145, such that the paper 142 is sandwiched between the counter roller 152 and the conveyance belt 151; a conveyance guide 153 for making the paper 142, which is sent upward in the substantially vertical direction, change its direction by approximately 90° and thusly correspond with the conveyance belt 151; and an end pressurizing roller 155 biased toward the conveyance belt 151 side by a pressing member 154. Also, there is provided a charging roller 156 as a charging unit for charging the surface of the conveyance belt 151.

The conveyance belt 151 is an endless belt and is capable of moving in circles in the belt conveyance direction, with being wound around a conveyance roller 157 and a tension roller 158 in a stretched manner. The conveyance belt 151 has, for example, a surface layer serving as a paper adsorbing surface, that is formed of a resinous material such as an ethylene-tetrafluoroethylene copolymer (ETFE) having a thickness of approximately 40 μm for which resistance control has not been conducted, and a back layer (intermediate resistance layer, ground layer) that is formed of the same material as this surface layer, for which resistance control has been conducted using carbon. On the back of the conveyance belt 151, a guide member 161 is placed correspondingly to a region where printing is performed by the recording head 134. Additionally, as a paper discharge unit for discharging the paper 142 on which images have been recorded by the recording head 134, there are provided a separation claw 171 for separating the paper 142 from the conveyance belt 151, a paper discharge roller 172 and a paper discharge small roller 173, with the paper discharge tray 103 being placed below the paper discharge roller 172.

A double-sided paper feeding unit 181 is mounted on a rear surface portion of the apparatus main body 101 in a freely detachable manner. The double-sided paper feeding unit 181 takes in the paper 142 returned by rotation of the conveyance belt 151 in the opposite direction and reverses it, then re-feeds it between the counter roller 152 and the conveyance belt 151. Additionally, a manual paper feeding unit 182 is provided on an upper surface of the double-sided paper feeding unit 181.

In this inkjet recording apparatus, the sheets of paper 142 are fed one by one from the paper feeding unit, and the paper 142 fed upward in the substantially vertical direction is guided by the guide 145 and conveyed between the conveyance belt 151 and the counter roller 152. Furthermore, the conveyance direction of the paper 142 is changed by approximately 90°, as an end of the paper 142 is guided by the conveyance guide 153 and pressed onto the conveyance belt 151 by the end pressurizing roller 155.

On this occasion, the conveyance belt 151 is charged by the charging roller 156, and the paper 142 is electrostatically adsorbed onto the conveyance belt 151 and thusly conveyed. Here, by driving the recording head 134 according to image signals while moving the carriage 133, ink droplets are ejected onto the paper 142 having stopped so as to perform recording for one line, and after the paper 142 is conveyed by a predetermined distance, recording for the next line is performed. On receipt of a recording completion signal or such a signal as indicates that the rear end of the paper 142 has reached the recording region, recording operation is finished, and the paper 142 is discharged onto the paper discharge tray 103.

Once the amount of ink remaining in the sub-tanks 135 has been detected as too small, a required amount of recording ink is supplied from the ink cartridge 200 into the sub-tanks 135.

As to this inkjet recording apparatus, when ink in the ink cartridge 200 has been used up, it is possible to replace only the ink bag inside the ink cartridge 200 by dismantling the housing of the ink cartridge 200. Also, even when the ink cartridge 200 is longitudinally placed and employs a front-loading structure, it is possible to supply ink stably. Therefore, even when the apparatus main body 101 is installed with little space over it, for example when the apparatus main body 101 is stored in a rack or when an object is placed over the apparatus main body 101, it is possible to replace the ink cartridge 200 with ease.

It should be noted that although the inkjet recording method of the present invention has been described referring to an example in which it is applied to a serial-type (shuttle-type) inkjet recording apparatus where a carriage performs scanning, the inkjet recording method of the present invention can also be applied to line-type inkjet recording apparatuses provided with line-type heads.

Also, the inkjet recording apparatus and the inkjet recording method of the present invention can be applied to a variety of types of recording based upon inkjet recording systems. For example, they can be particularly suitably applied to inkjet recording printers, facsimile apparatuses, copiers, printer/fax/copier multifunctional peripherals, and so forth.

<Ink Recorded Matter>

An ink recorded matter used in the present invention includes: a recording medium; and an image formed on the recording medium with the inkjet recording ink of the present invention.

—Recording Medium—

The recording medium is not particularly limited and may be appropriately selected depending on the intended purpose. Any of a recording medium having absorbability with respect to the inkjet recording ink (e.g., paper) and a recording medium having substantially no absorbability with respect to the inkjet recording ink is suitably used.

Examples of the recording medium include: plastic sheets made of base materials such as polyethylene terephthalates, polycarbonates, polypropylenes, polyethylenes, polysulfones, ABS resins, and polyvinyl chlorides; recording media formed by subjecting a surface of a metal such as brass, iron, aluminum, stainless steel (SUS), or copper, or a non-metallic base material to a metal coating treatment by, for example, vapor deposition; recording media formed by subjecting paper serving as a base material to a water repellent treatment; and recording media formed of a so-called ceramics material which is obtained by firing an inorganic material at high temperature. Among them, paper is preferred in terms of being economical and natural in texture. In the present invention, any of smooth paper and non-smooth paper is suitably used.

Paper serving as the recording medium is classified into the smooth paper or the non-smooth paper in terms of a measurement of its smoothness.

The non-smooth paper has a smoothness of less than 500 seconds and is plain paper without being subjected to a treatment such as surface coating.

Many of the smooth paper are subjected to a surface coating treatment. The smooth paper has a smoothness of 500 seconds or more, and examples thereof include gloss paper such as art paper and cast coat paper.

The smoothness can be measured with, for example, an Oken-type meter with which in a state where a hollow head is put on a paper surface and the interior is reduced in pressure, a time (seconds) for which a certain amount of air inflows from the gap between the head and the paper surface is measured to obtain the smoothness.

EXAMPLES

The present invention will next be described by way of Examples, which should not be construed as limiting the present invention thereto.

Preparation Example 1

Preparation of Black Pigment Dispersion Liquid

Into 3,000 mL of 2.5N sodium sulfate solution, 90 g of carbon black having a CTAB specific surface area of 150 m²/g and a DBP oil absorption of 100 mL/100 g was added, then the mixture was stirred at a temperature of 60° C. and a rotational speed of 300 rpm and subjected to reaction for 10 hr, and the carbon black was thus oxidized. This reaction mixture was filtrated, then the carbon black which had been filtrated was neutralized with a sodium hydroxide solution and subjected to ultrafiltration. The carbon black obtained was washed with water, dried and dispersed into purified water such that the pigment concentration was 20% by mass. Through the above procedure, a black pigment dispersion liquid of Preparation Example 1 was prepared.

Preparation Example 2

Preparation of Yellow Pigment Dispersion Liquid

C.I. Pigment Yellow 128 was subjected to a low-temperature plasma treatment to prepare a yellow pigment with a carboxylic acid group introduced. The prepared yellow pigment was dispersed in ion-exchange water, and the resultant dispersed product was subjected to desalting and concentration with an ultrafiltration membrane, to thereby prepare a yellow pigment dispersion liquid of Preparation Example 2 having a pigment concentration of 15% by mass.

Preparation Example 3

Preparation of Magenta Pigment Dispersion Liquid

A surface-modified magenta pigment was prepared in the same manner as in Preparation Example 2 except that C.I. Pigment Yellow 128 was changed to C.I. Pigment Red 122. The prepared magenta pigment was dispersed in ion-exchange water, and the resultant dispersed product was subjected to desalting and concentration with an ultrafiltration membrane, to thereby prepare a magenta pigment dispersion liquid of Preparation Example 3 having a pigment concentration of 15% by mass.

Preparation Example 4

Preparation of Cyan Pigment Dispersion Liquid

A surface-modified cyan pigment was prepared in the same manner as in Preparation Example 2 except that C.I. Pigment Yellow 128 was changed to C.I. Pigment Cyan 15:3. The prepared cyan pigment was dispersed in ion-exchange water, and the resultant dispersed product was subjected to desalting and concentration with an ultrafiltration membrane, to thereby prepare a cyan pigment dispersion liquid of Preparation Example 4 having a pigment concentration of 15% by mass.

Example 1

An ink composition having the following formulation was prepared and then filtrated through a membrane filter having an average pore size of 0.8 μm, to thereby prepare a cyan ink of Example 1.
[Materials of ink and amounts thereof]
    Cyan pigment dispersion liquid of Preparation Example 4 (pigment concentration: 15% by mass): 20.00% by mass
        1,3-Butanediol: 23.00% by mass
        Glycerin: 8.00% by mass
        2-Ethyl-1,3-hexanediol: 2.00% by mass
        CAPSTONE FS-3100 (product of DuPont Co.): 0.04% by mass
    PROXEL LV (product of Avecia Biotechnology Inc., 1,2-benzisothiazolin-3-one, a fungicide): 0.20% by mass
    Silicone defoamer (SH5500, product of Dow Corning Toray Co.): 0.05% by mass
    2-Amino-2-ethyl-1,3-propanediol: 0.30% by mass
    Ion-exchange water: balance (total: 100% by mass)

Example 2

An ink composition having the following formulation was prepared by a routine method and then filtrated through a membrane filter having an average pore size of 0.8 μm, to thereby prepare a cyan ink of Example 2.
[Materials of Ink and Amounts Thereof]
    Cyan pigment dispersion liquid of Preparation Example 4 (pigment concentration: 15% by mass): 20.00% by mass
        3-Methyl-1,3-butanediol: 10.00% by mass
        Hexylene glycol: 4.00% by mass
        Glycerin: 8.00% by mass
        2-Ethyl-1,3-hexanediol: 2.00% by mass
        CAPSTONE FS-3100 (product of DuPont Co.): 0.10% by mass
    PROXEL LV (product of Avecia Biotechnology Inc., 1,2-benzisothiazolin-3-one, a fungicide): 0.20% by mass
    Silicone defoamer (KM-72F, product of Shin-Etsu Silicone Co., Ltd.): 0.10% by mass
    2-Amino-2-ethyl-1,3-propanediol: 0.50% by mass
    Ion-exchange water: balance (total: 100% by mass)

Example 3

An ink composition having the following formulation was prepared by a routine method and then filtrated through a membrane filter having an average pore size of 0.8 μm, to thereby prepare a cyan ink of Example 3.
[Materials of Ink and Amounts Thereof]
    Cyan pigment dispersion liquid of Preparation Example 4 (pigment concentration: 15% by mass): 20.00% by mass
        3-Methyl-1,3-butanediol: 13.00% by mass
        3-Methyl-1,5-pentanediol: 10.50% by mass
        Glycerin: 8.00% by mass
        2,2,4-Trimethyl-1,3-pentanediol: 2.00% by mass
        CAPSTONE FS-3100 (product of DuPont Co.): 0.30% by mass
    PROXEL LV (product of Avecia Biotechnology Inc., 1,2-benzisothiazolin-3-one, a fungicide): 0.20% by mass
    Silicone defoamer (KM-98, product of Shin-Etsu Silicone Co., Ltd.): 0.50% by mass
    2-Amino-2-ethyl-1,3-propanediol: 0.50% by mass
    Ion-exchange water: balance (total: 100% by mass)

Example 4

An ink composition having the following formulation was prepared by a routine method and then filtrated through a membrane filter having an average pore size of 0.8 μm, to thereby prepare a cyan ink of Example 4.
[Materials of Ink and Amounts Thereof]
    Cyan pigment dispersion liquid of Preparation Example 4 (pigment concentration: 15% by mass): 20.00% by mass
        1,3-Butanediol: 23.00% by mass
        Glycerin: 8.00% by mass
        2-Ethyl-1,3-hexanediol: 2.00% by mass
        CAPSTONE FS-3100 (product of DuPont Co.): 1.25% by mass
    PROXEL LV (product of Avecia Biotechnology Inc., 1,2-benzisothiazolin-3-one, a fungicide): 0.20% by mass Silicone defoamer (SM5571 EMULSION, product of Dow Corning Toray Co.): 0.04% by mass
2-Amino-2-ethyl-1,3-propanediol: 0.30% by mass
Ion-exchange water: balance (total: 100% by mass)

Example 5

An ink composition having the following formulation was prepared by a routine method and then filtrated through a membrane filter having an average pore size of 0.8 μm, to thereby prepare a magenta ink of Example 5.
[Materials of Ink and Amounts Thereof]
Magenta pigment dispersion liquid of Preparation Example 3 (pigment concentration: 15% by mass): 20.00% by mass
1,3-Butanediol: 22.50% by mass
Glycerin: 9.00% by mass
2-Ethyl-1,3-hexanediol: 2.00% by mass
CAPSTONE FS-3100 (product of DuPont Co.): 0.05% by mass
PROXEL LV (product of Avecia Biotechnology Inc., 1,2-benzisothiazolin-3-one, a fungicide): 0.20% by mass
Silicone defoamer (KM-72F, product of Shin-Etsu Silicone Co., Ltd.): 0.40% by mass
2-Amino-2-ethyl-1,3-propanediol: 0.30% by mass
Ion-exchange water: balance (total: 100% by mass)

Example 6

An ink composition having the following formulation was prepared by a routine method and then filtrated through a membrane filter having an average pore size of 0.8 μm, to thereby prepare a magenta ink of Example 6.
[Materials of Ink and Amounts Thereof]
Magenta pigment dispersion liquid of Preparation Example 3 (pigment concentration: 15% by mass): 20.00% by mass
3-Methyl-1,3-butanediol: 11.50% by mass
Ethylene glycol: 5.00% by mass
Glycerin: 7.00% by mass
2-Ethyl-1,3-hexanediol: 2.00% by mass
CAPSTONE FS-3100 (product of DuPont Co.): 1.00% by mass
PROXEL LV (product of Avecia Biotechnology Inc., 1,2-benzisothiazolin-3-one, a fungicide): 0.20% by mass
Silicone defoamer (SM5512, product of Dow Corning Toray Co.): 0.07% by mass
2-Amino-2-ethyl-1,3-propanediol: 0.30% by mass
Ion-exchange water: balance (total: 100% by mass)

Example 7

An ink composition having the following formulation was prepared by a routine method and then filtrated through a membrane filter having an average pore size of 0.8 μm, to thereby prepare a magenta ink of Example 7.
[Materials of Ink and Amounts Thereof]
Magenta pigment dispersion liquid of Preparation Example 3 (pigment concentration: 15% by mass): 20.00% by mass
3-Methyl-1,5-pentanediol: 5.00% by mass
3-Methyl-1,3-butanediol: 5.00% by mass
Glycerin: 10.00% by mass
2,2,4-Trimethyl-1,3-pentanediol: 2.00% by mass
CAPSTONE FS-3100 (product of DuPont Co.): 1.50% by mass
PROXEL LV (product of Avecia Biotechnology Inc., 1,2-benzisothiazolin-3-one, a fungicide): 0.20% by mass
Silicone defoamer (KM-98, product of Shin-Etsu Silicone Co., Ltd.): 0.05% by mass
2-Amino-2-ethyl-1,3-propanediol: 0.50% by mass
Ion-exchange water: balance (total: 100% by mass)

Example 8

An ink composition having the following formulation was prepared by a routine method and then filtrated through a membrane filter having an average pore size of 0.8 μm, to thereby prepare a magenta ink of Example 8.
[Materials of Ink and Amounts Thereof]
Magenta pigment dispersion liquid of Preparation Example 3 (pigment concentration: 15% by mass): 20.00% by mass
1,3-butanediol: 22.50% by mass
Glycerin: 9.00% by mass
2-Ethyl-1,3-hexanediol: 2.00% by mass
CAPSTONE FS-3100 (product of DuPont Co.): 0.50% by mass
PROXEL LV (product of Avecia Biotechnology Inc., 1,2-benzisothiazolin-3-one, a fungicide): 0.20% by mass
Silicone defoamer (SM5571 EMULSION, product of Dow Corning Toray Co.): 0.60% by mass
2-Amino-2-ethyl-1,3-propanediol: 0.30% by mass
Ion-exchange water: balance (total: 100% by mass)

Example 9

An ink composition having the following formulation was prepared by a routine method and then filtrated through a membrane filter having an average pore size of 0.8 μm, to thereby prepare a yellow ink of Example 9.
[Materials of Ink and Amounts Thereof]
Yellow pigment dispersion liquid of Preparation Example 2 (pigment concentration: 15% by mass): 20.00% by mass
3-Methyl-1,3-butanediol: 20.00% by mass
1,3-Butanediol: 8.50% by mass
Glycerin: 7.50% by mass
2-Ethyl-1,3-hexanediol: 2.00% by mass
CAPSTONE FS-3100 (product of DuPont Co.): 0.04% by mass
Silicone defoamer (KM-98, product of Shin-Etsu Silicone Co., Ltd.): 0.50% by mass
PROXEL LV (product of Avecia Biotechnology Inc., 1,2-benzisothiazolin-3-one, a fungicide): 0.20% by mass
1-Methylamino-2,3-propanediol: 0.10% by mass
Ion-exchange water: balance (total: 100% by mass)

Example 10

An ink composition having the following formulation was prepared by a routine method and then filtrated through a membrane filter having an average pore size of 0.8 μm, to thereby prepare a yellow ink of Example 10.
[Materials of Ink and Amounts Thereof]
Yellow pigment dispersion liquid of Preparation Example 2 (pigment concentration: 15% by mass): 20.00% by mass
3-Methyl-1,5-pentanediol: 12.50% by mass
3-Methyl-1,3-butanediol: 15.00% by mass
Glycerin: 7.00% by mass
2,2,4-Trimethyl-1,3-pentanediol: 2.00% by mass
CAPSTONE FS-3100 (product of DuPont Co.): 1.10% by mass Silicone defoamer (KM-72F, product of Shin-Etsu Silicone Co., Ltd.): 0.09% by mass
PROXEL LV (product of Avecia Biotechnology Inc., 1,2-benzisothiazolin-3-one, a fungicide): 0.20% by mass
2-Amino-2-ethyl-1,3-propanediol: 0.50% by mass
Ion-exchange water: balance (total: 100% by mass)

Example 11

An ink composition having the following formulation was prepared by a routine method and then filtrated through a membrane filter having an average pore size of 0.8 μm, to thereby prepare a yellow ink of Example 11.
[Materials of Ink and Amounts Thereof]
Yellow pigment dispersion liquid of Preparation Example 2 (pigment concentration: 15% by mass): 20.00% by mass
1,6-Hexanediol: 24.50% by mass
Glycerin: 8.00% by mass
2-Ethyl-1,3-hexanediol: 2.00% by mass
CAPSTONE FS-3100 (product of DuPont Co.): 0.20% by mass
PROXEL LV (product of Avecia Biotechnology Inc., 1,2-benzisothiazolin-3-one, a fungicide): 0.20% by mass
Silicone defoamer (SM5512, product of Dow Corning Toray Co.): 0.30% by mass
2-Amino-2-ethyl-1,3-propanediol: 0.30% by mass
Ion-exchange water: balance (total: 100% by mass)

Example 12

An ink composition having the following formulation was prepared by a routine method and then filtrated through a membrane filter having an average pore size of 0.8 μm, to thereby prepare a black ink of Example 12. [Materials of Ink and Amounts Thereof]
Black pigment dispersion liquid of Preparation Example 1 (pigment concentration: 20% by mass): 20.00% by mass
2-Methyl-2,4-pentanediol: 11.50% by mass
3-Methyl-1,3-butanediol: 13.00% by mass
Glycerin: 7.50% by mass
2-Pyrrolidone: 2.00% by mass
CAPSTONE FS-3100 (product of DuPont Co.): 0.60% by mass
2,2,4-Trimethyl-1,3-pentanediol: 2.00% by mass
Silicone defoamer (KM-72F, product of Shin-Etsu Silicone Co., Ltd.): 0.20% by mass
PROXEL LV (product of Avecia Biotechnology Inc., 1,2-benzisothiazolin-3-one, a fungicide): 0.20% by mass
Ion-exchange water: balance (total: 100% by mass)

Example 13

An ink composition having the following formulation was prepared by a routine method and then filtrated through a membrane filter having an average pore size of 0.8 μm, to thereby prepare a black ink of Example 13.
[Materials of Ink and Amounts Thereof]
Black pigment dispersion liquid of Preparation Example 1 (pigment concentration: 20% by mass): 20.00% by mass
3-Methyl-1,3-butanediol: 22.50% by mass
Glycerin: 7.50% by mass
2-Pyrrolidone: 2.00% by mass
2-Ethyl-1,3-hexanediol: 2.00% by mass
CAPSTONE FS-3100 (product of DuPont Co.): 1.00% by mass
PROXEL LV (product of Avecia Biotechnology Inc., 1,2-benzisothiazolin-3-one, a fungicide): 0.20% by mass
Silicone defoamer (SM5512, product of Dow Corning Toray Co.): 0.10% by mass
2-Amino-2-ethyl-1,3-propanediol: 0.50% by mass
Ion-exchange water: balance (total: 100% by mass)

Example 14

An ink composition having the following formulation was prepared by a routine method and then filtrated through a membrane filter having an average pore size of 0.8 μm, to thereby prepare a black ink of Example 14.
[Materials of Ink and Amounts Thereof]
Black pigment dispersion liquid of Preparation Example 1 (pigment concentration: 20% by mass): 20.00% by mass
1,5-Pentanediol: 22.50% by mass
Glycerin: 7.50% by mass
2-Pyrrolidone: 2.00% by mass
2-Ethyl-1,3-hexanediol: 2.00% by mass
CAPSTONE FS-3100 (product of DuPont Co.): 0.05% by mass
PROXEL LV (product of Avecia Biotechnology Inc., 1,2-benzisothiazolin-3-one, a fungicide): 0.20% by mass
Silicone defoamer (KM-98, product of Shin-Etsu Silicone Co., Ltd.): 0.03% by mass
2-Amino-2-ethyl-1,3-propanediol: 0.50% by mass
Ion-exchange water: balance (total: 100% by mass)

Example 15

An ink composition having the following formulation was prepared by a routine method and then filtrated through a membrane filter having an average pore size of 0.8 μm, to thereby prepare a magenta ink of Example 15.
[Materials of Ink and Amounts Thereof]
Magenta pigment dispersion liquid of Preparation Example 3 (pigment concentration: 15% by mass): 20.00% by mass
1,3-Butanediol: 22.50% by mass
Glycerin: 9.00% by mass
2-Ethyl-1,3-hexanediol: 2.00% by mass
CAPSTONE FS-3100 (product of DuPont Co.): 0.30% by mass
SURFYNOL 104PA (product of Air Products Japan Co., Ltd.): 0.20% by mass
PROXEL LV (product of Avecia Biotechnology Inc., 1,2-benzisothiazolin-3-one, a fungicide): 0.20% by mass
Silicone defoamer (SM5571 EMULSION, product of Dow Corning Toray Co.): 0.60% by mass
2-Amino-2-ethyl-1,3-propanediol: 0.30% by mass
Ion-exchange water: balance (total: 100% by mass)

Example 16

An ink composition having the following formulation was prepared by a routine method and then filtrated through a membrane filter having an average pore size of 0.8 μm, to thereby prepare a magenta ink of Example 16.
[Materials of Ink and Amounts Thereof]
Magenta pigment dispersion liquid of Preparation Example 3 (pigment concentration: 15% by mass): 20.00% by mass
1,3-Butanediol: 22.50% by mass
Glycerin: 9.00% by mass
2-Ethyl-1,3-hexanediol: 2.00% by mass
CAPSTONE FS-3100 (product of DuPont Co.): 0.25% by mass SURFYNOL 104PA (product of Air Products Japan Co., Ltd.): 0.25% by mass
PROXEL LV (product of Avecia Biotechnology Inc., 1,2-benzisothiazolin-3-one, a fungicide): 0.20% by mass
Silicone defoamer (SM5571 EMULSION, product of Dow Corning Toray Co.): 0.60% by mass
2-Amino-2-ethyl-1,3-propanediol: 0.30% by mass
Ion-exchange water: balance (total: 100% by mass)

Example 17

An ink composition having the following formulation was prepared by a routine method and then filtrated through a membrane filter having an average pore size of 0.8 µm, to thereby prepare a magenta ink of Example 17.
[Materials of Ink and Amounts Thereof]
Magenta pigment dispersion liquid of Preparation Example 3 (pigment concentration: 15% by mass): 20.00% by mass
1,3-Butanediol: 22.50% by mass
Glycerin: 9.00% by mass
2-Ethyl-1,3-hexanediol: 2.00% by mass
CAPSTONE FS-3100 (product of DuPont Co.): 0.30% by mass
SURFYNOL 104PA (product of Air Products Japan Co., Ltd.): 0.30% by mass
PROXEL LV (product of Avecia Biotechnology Inc., 1,2-benzisothiazolin-3-one, a fungicide): 0.20% by mass
Silicone defoamer (SM5571 EMULSION, product of Dow Corning Toray Co.): 0.60% by mass
2-Amino-2-ethyl-1,3-propanediol: 0.30% by mass
Ion-exchange water: balance (total: 100% by mass)

Example 18

An ink composition having the following formulation was prepared by a routine method and then filtrated through a membrane filter having an average pore size of 0.8 µm, to thereby prepare a cyan ink of Example 18.
[Materials of Ink and Amounts Thereof]
Cyan pigment dispersion liquid of Preparation Example 4 (pigment concentration: 15% by mass): 20.00% by mass
1,3-Butanediol: 23.00% by mass
Glycerin: 8.00% by mass
2-Ethyl-1,3-hexanediol: 2.00% by mass
CAPSTONE FS-30 (product of DuPont Co.): 0.04% by mass
PROXEL LV (product of Avecia Biotechnology Inc., 1,2-benzisothiazolin-3-one, a fungicide): 0.20% by mass
Silicone defoamer (SH5500, product of Dow Corning Toray Co.): 0.05% by mass
2-Amino-2-ethyl-1,3-propanediol 0.30% by mass
Ion-exchange water: balance (total: 100% by mass)

Example 19

An ink composition having the following formulation was prepared by a routine method and then filtrated through a membrane filter having an average pore size of 0.8 µm, to thereby prepare a cyan ink of Example 19.
[Materials of Ink and Amounts Thereof]
Cyan pigment dispersion liquid of Preparation Example 4 (pigment concentration: 15% by mass): 20.00% by mass
3-Methyl-1,3-butanediol: 13.00% by mass
3-Methyl-1,5-pentanediol: 10.50% by mass
Glycerin: 8.00% by mass
2,2,4-Trimethyl-1,3-pentanediol: 2.00% by mass CAPSTONE FS-34 (product of DuPont Co.): 0.30% by mass
PROXEL LV (product of Avecia Biotechnology Inc., 1,2-benzisothiazolin-3-one, a fungicide): 0.20% by mass
Silicone defoamer (KM-98, product of Shin-Etsu Silicone Co., Ltd.): 0.50% by mass
2-Amino-2-ethyl-1,3-propanediol: 0.50% by mass
Ion-exchange water: balance (total: 100% by mass)

Example 20

An ink composition having the following formulation was prepared by a routine method and then filtrated through a membrane filter having an average pore size of 0.8 µm, to thereby prepare a magenta ink of Example 20.
[Materials of Ink and Amounts Thereof]
Magenta pigment dispersion liquid of Preparation Example 3 (pigment concentration: 15% by mass): 20.00% by mass
3-Methyl-1,3-butanediol: 11.50% by mass
Ethylene glycol: 5.00% by mass
Glycerin: 7.00% by mass
2-Ethyl-1,3-hexanediol: 2.00% by mass
CAPSTONE FS-34 (product of DuPont Co.): 1.00% by mass
PROXEL LV (product of Avecia Biotechnology Inc., 1,2-benzisothiazolin-3-one, a fungicide): 0.20% by mass
Silicone defoamer (SM5512, product of Dow Corning Toray Co.): 0.07% by mass
2-Amino-2-ethyl-1,3-propanediol: 0.30% by mass
Ion-exchange water: balance (total: 100% by mass)

Example 21

An ink composition having the following formulation was prepared by a routine method and then filtrated through a membrane filter having an average pore size of 0.8 to thereby prepare a yellow ink of Example 21.
[Materials of Ink and Amounts Thereof]
Yellow pigment dispersion liquid of Preparation Example 2 (pigment concentration: 15% by mass): 20.00% by mass
3-Methyl-1,3-butanediol: 20.00% by mass
1,3-Butanediol: 8.50% by mass
Glycerin: 7.50% by mass
2-Ethyl-1,3-hexanediol: 2.00% by mass
CAPSTONE FS-34 (product of DuPont Co.): 0.40% by mass
PROXEL LV (product of Avecia Biotechnology Inc., 1,2-benzisothiazolin-3-one, a fungicide): 0.20% by mass
Silicone defoamer (KM-98, product of Shin-Etsu Silicone Co., Ltd.): 0.50% by mass
1-Methylamino-2,3-propanediol: 0.10% by mass
Ion-exchange water: balance (total: 100% by mass)

Example 22

An ink composition having the following formulation was prepared by a routine method and then filtrated through a membrane filter having an average pore size of 0.8 µm, to thereby prepare a magenta ink of Example 22.
[Materials of Ink and Amounts Thereof]
Magenta pigment dispersion liquid of Preparation Example 3 (pigment concentration: 15% by mass): 20.00% by mass
3-Methyl-1,3-butanediol: 11.50% by mass
Ethylene glycol: 5.00% by mass
Glycerin: 7.00% by mass 2-Ethyl-1,3-hexanediol: 2.00% by mass
CAPSTONE FS-34 (product of DuPont Co.): 1.00% by mass
PROXEL LV (product of Avecia Biotechnology Inc., 1,2-benzisothiazolin-3-one, a fungicide): 0.20% by mass
Foam destroying polymer defoamer (BYK-1790, product of BYK Chemie Japan KK): 0.10% by mass
2-Amino-2-ethyl-1,3-propanediol: 0.30% by mass
Ion-exchange water: balance (total: 100% by mass)

Comparative Example 1

An ink composition having the following formulation was prepared by a routine method and then filtrated through a membrane filter having an average pore size of 0.8 μm, to thereby prepare a cyan ink of Comparative Example 1.
[Materials of Ink and Amounts Thereof]
Cyan pigment dispersion liquid of Preparation Example 4 (pigment concentration: 15% by mass): 20.00% by mass
1,3-Butanediol: 23.00% by mass
Glycerin: 8.00% by mass
2-Ethyl-1,3-hexanediol: 2.00% by mass
ZONYL FS-300 represented by the following General Formula: $C_8F_{17}$—$CH_2CH_2O(CH_2CH_2O)xH$, where x is 1 to 40 (product of DuPont Co., polyoxyethylene perfluoroalkyl ether, active ingredient: 40% by mass): 0.50% by mass
PROXEL LV (product of Avecia Biotechnology Inc., 1,2-benzisothiazolin-3-one, a fungicide): 0.20% by mass
2-Amino-2-ethyl-1,3-propanediol: 0.30% by mass
Ion-exchange water: balance (total: 100% by mass)

Comparative Example 2

An ink composition having the following formulation was prepared by a routine method and then filtrated through a membrane filter having an average pore size of 0.8 μm, to thereby prepare a cyan ink of Comparative Example 2.
[Materials of Ink and Amounts Thereof]
Cyan pigment dispersion liquid of Preparation Example 4 (pigment concentration: 15% by mass): 20.00% by mass
3-Methyl-1,3-butanediol: 10.00% by mass
Hexylene glycol: 4.00% by mass
Glycerin: 8.00% by mass
2-Ethyl-1,3-hexanediol: 2.00% by mass
ECTD-3NEX (product of NIKKO CHEMICALS CO., LTD., an anionic surfactant, sodium polyoxyethylene(3) tridecylether acetate): 1.00% by mass
PROXEL LV (product of Avecia Biotechnology Inc., 1,2-benzisothiazolin-3-one, a fungicide): 0.20% by mass
2-Amino-2-ethyl-1,3-propanediol: 0.50% by mass
Ion-exchange water: balance (total: 100% by mass)

Comparative Example 3

An ink composition having the following formulation was prepared by a routine method and then filtrated through a membrane filter having an average pore size of 0.8 μm, to thereby prepare a cyan ink of Comparative Example 3.
[Materials of Ink and Amounts Thereof]
Cyan pigment dispersion liquid of Preparation Example 4 (pigment concentration: 15% by mass): 20.00% by mass
3-Methyl-1,3-butanediol: 10.00% by mass
Hexylene glycol: 4.00% by mass
Glycerin: 8.00% by mass
2-Ethyl-1,3-hexanediol: 2.00% by mass MARPOMARSE PT (product of Matsumoto Yushi-Seiyaku Co., Ltd., dioctylsulfosuccinic acid salt): 0.10% by mass
PROXEL LV (product of Avecia Biotechnology Inc., 1,2-benzisothiazolin-3-one, a fungicide): 0.20% by mass
2-Amino-2-ethyl-1,3-propanediol: 0.50% by mass
Ion-exchange water: balance (total: 100% by mass)

Comparative Example 4

An ink composition having the following formulation was prepared by a routine method and then filtrated through a membrane filter having an average pore size of 0.8 μm, to thereby prepare a magenta ink of Comparative Example 4.
[Materials of Ink and Amounts Thereof]
Magenta pigment dispersion liquid of Preparation Example 3 (pigment concentration: 15% by mass): 20.00% by mass
1,3-Butanediol: 22.50% by mass
Glycerin: 9.00% by mass
2-Ethyl-1,3-hexanediol: 2.00% by mass
ECTD-3NEX (product of NIKKO CHEMICALS CO., LTD., an anionic surfactant, sodium polyoxyethylene(3) tridecylether acetate): 0.05% by mass
PROXEL LV (product of Avecia Biotechnology Inc., 1,2-benzisothiazolin-3-one, a fungicide): 0.20% by mass
2-Amino-2-ethyl-1,3-propanediol: 0.30% by mass
Ion-exchange water: balance (total: 100% by mass)

Comparative Example 5

An ink composition having the following formulation was prepared by a routine method and then filtrated through a membrane filter having an average pore size of 0.8 μm, to thereby prepare a magenta ink of Comparative Example 5.
[Materials of Ink and Amounts Thereof]
Magenta pigment dispersion liquid of Preparation Example 3 (pigment concentration: 15% by mass): 20.00% by mass
3-Methyl-1,3-butanediol: 11.50% by mass
Ethylene glycol: 5.00% by mass
Glycerin: 7.00% by mass
2-Ethyl-1,3-hexanediol: 2.00% by mass
ECTD-3NEX (product of NIKKO CHEMICALS CO., LTD., an anionic surfactant, sodium polyoxyethylene(3) tridecylether acetate): 0.50% by mass
PROXEL LV (product of Avecia Biotechnology Inc., 1,2-benzisothiazolin-3-one, a fungicide): 0.20% by mass
2-Amino-2-ethyl-1,3-propanediol: 0.30% by mass
Ion-exchange water: balance (total: 100% by mass)

Comparative Example 6

An ink composition having the following formulation was prepared by a routine method and then filtrated through a membrane filter having an average pore size of 0.8 μm, to thereby prepare a magenta ink of Comparative Example 6.
[Materials of Ink and Amounts Thereof]
Magenta pigment dispersion liquid of Preparation Example 3 (pigment concentration: 15% by mass): 20.00% by mass
1,3-Butanediol: 22.50% by mass
Glycerin: 9.00% by mass
2-Ethyl-1,3-hexanediol: 2.00% by mass
SURFYNOL 104PA (product of Air Products Japan Co., Ltd.): 0.05% by mass PROXEL LV (product of Avecia Biotechnology Inc., 1,2-benzisothiazolin-3-one, a fungicide): 0.20% by mass
2-Amino-2-ethyl-1,3-propanediol: 0.30% by mass
Ion-exchange water: balance (total: 100% by mass)

Comparative Example 7

An ink composition having the following formulation was prepared by a routine method and then filtrated through a membrane filter having an average pore size of 0.8 μm, to thereby prepare a yellow ink of Comparative Example 7.
[Materials of Ink and Amounts Thereof]
Yellow pigment dispersion liquid of Preparation Example 2 (pigment concentration: 15% by mass): 20.00% by mass
1,6-Hexanediol: 24.50% by mass
Glycerin: 8.00% by mass
2-Ethyl-1,3-hexanediol: 2.00% by mass
UNISAFE A-LY (a nonionic surfactant, NOF CORPORATION, polyethylene coconut oil alkyl dimethylamine oxide): 0.50% by mass
PROXEL LV (product of Avecia Biotechnology Inc., 1,2-benzisothiazolin-3-one, a fungicide): 0.20% by mass
2-Amino-2-ethyl-1,3-propanediol: 0.30% by mass
Ion-exchange water: balance (total: 100% by mass)

Comparative Example 8

An ink composition having the following formulation was prepared by a routine method and then filtrated through a membrane filter having an average pore size of 0.8 μm, to thereby prepare a yellow ink of Comparative Example 8.
[Materials of Ink and Amounts Thereof]
Yellow pigment dispersion liquid of Preparation Example 2 (pigment concentration: 15% by mass): 20.00% by mass
3-Methyl-1,5-pentanediol: 12.50% by mass
3-Methyl-1,3-butanediol: 15.00% by mass
Glycerin: 7.00% by mass
2,2,4-Trimethyl-1,3-pentanediol: 2.00% by mass
ZONYL FS-300 represented by the following General Formula: $C_8F_{17}$—$CH_2CH_2O(CH_2CH_2O)xH$, where x is 1 to 40 (product of DuPont Co., polyoxyethylene perfluoroalkyl ether, active ingredient: 40% by mass): 1.00% by mass
PROXEL LV (product of Avecia Biotechnology Inc., 1,2-benzisothiazolin-3-one, a fungicide): 0.20% by mass
2-Amino-2-ethyl-1,3-propanediol: 0.50% by mass
Ion-exchange water: balance (total: 100% by mass)

Comparative Example 9

An ink composition having the following formulation was prepared by a routine method and then filtrated through a membrane filter having an average pore size of 0.8 μm, to thereby prepare a yellow ink of Comparative Example 9.
[Materials of Ink and Amounts Thereof]
Yellow pigment dispersion liquid of Preparation Example 2 (pigment concentration: 15% by mass): 20.00% by mass
3-Methyl-1,3-butanediol: 20.00% by mass
1,3-Butanediol: 8.50% by mass
Glycerin: 7.50% by mass
2-Ethyl-1,3-hexanediol: 2.00% by mass
MARPOMARSE PT (product of Matsumoto Yushi-Seiyaku Co., Ltd., dioctylsulfosuccinic acid salt): 0.40% by mass
PROXEL LV (product of Avecia Biotechnology Inc., 1,2-benzisothiazolin-3-one, a fungicide): 0.20% by mass
1-Methylamino-2,3-propanediol: 0.10% by mass
Ion-exchange water: balance (total: 100% by mass)

Comparative Example 10

An ink composition having the following formulation was prepared by a routine method and then filtrated through a membrane filter having an average pore size of 0.8 μm, to thereby prepare a black ink of Comparative Example 10.
[Materials of Ink and Amounts Thereof]
Black pigment dispersion liquid of Preparation Example 1 (pigment concentration: 20% by mass): 20.00% by mass
1,5-Pentanediol: 22.50% by mass
Glycerin: 7.50% by mass
2-Pyrrolidone: 2.00% by mass
2-Ethyl-1,3-hexanediol: 2.00% by mass
ZONYL FS-300 represented by the following General Formula: $C_8F_{17}$—$CH_2CH_2O(CH_2CH_2O)xH$, where x is 1 to 40 (product of DuPont Co., polyoxyethylene perfluoroalkyl ether, active ingredient: 40% by mass): 0.70% by mass
PROXEL LV (product of Avecia Biotechnology Inc., 1,2-benzisothiazolin-3-one, a fungicide): 0.20% by mass
2-Amino-2-ethyl-1,3-propanediol: 0.50% by mass
Ion-exchange water: balance (total: 100% by mass)

Comparative Example 11

An ink composition having the following formulation was prepared by a routine method and then filtrated through a membrane filter having an average pore size of 0.8 μm, to thereby prepare a black ink of Comparative Example 11.
[Materials of Ink and Amounts Thereof]
Black pigment dispersion liquid of Preparation Example 1 (pigment concentration: 20% by mass): 20.00% by mass
3-Methyl-1,3-butanediol: 22.50% by mass
Glycerin: 7.50% by mass
2-Pyrrolidone: 2.00% by mass
2-Ethyl-1,3-hexanediol: 2.00% by mass
ECTD-3NEX (product of NIKKO CHEMICALS CO., LTD., an anionic surfactant, sodium polyoxyethylene(3) tridecylether acetate): 1.00% by mass
PROXEL LV (product of Avecia Biotechnology Inc., 1,2-benzisothiazolin-3-one, a fungicide): 0.20% by mass
2-Amino-2-ethyl-1,3-propanediol: 0.50% by mass
Ion-exchange water: balance (total: 100% by mass)

Comparative Example 12

An ink composition having the following formulation was prepared by a routine method and then filtrated through a membrane filter having an average pore size of 0.8 μm, to thereby prepare a black ink of Comparative Example 12.
[Materials of Ink and Amounts Thereof]
Black pigment dispersion liquid of Preparation Example 1 (pigment concentration: 20% by mass): 20.00% by mass
3-Methyl-1,3-butanediol: 22.50% by mass
Glycerin: 7.50% by mass
2-Pyrrolidone: 2.00% by mass
2-Ethyl-1,3-hexanediol: 2.00% by mass
MARPOMARSE PT (product of Matsumoto Yushi-Seiyaku Co., Ltd., dioctylsulfosuccinic acid salt): 1.00% by mass
PROXEL LV (product of Avecia Biotechnology Inc., 1,2-benzisothiazolin-3-one, a fungicide): 0.20% by mass
2-Amino-2-ethyl-1,3-propanediol: 0.50% by mass
Ion-exchange water: balance (total: 100% by mass)

Comparative Example 13

An ink composition having the following formulation was prepared by a routine method and then filtrated through a membrane filter having an average pore size of 0.8 μm, to thereby prepare a yellow ink of Comparative Example 13.
[Materials of Ink and Amounts Thereof]
Yellow pigment dispersion liquid of Preparation Example 2 (pigment concentration: 15% by mass): 20.00% by mass
1,6-Hexanediol: 24.50% by mass
Glycerin: 8.00% by mass
2-Ethyl-1,3-hexanediol: 2.00% by mass
CAPSTONE FS-3100 (product of DuPont Co.): 0.02% by mass
PROXEL LV (product of Avecia Biotechnology Inc., 1,2-benzisothiazolin-3-one, a fungicide): 0.20% by mass
2-Amino-2-ethyl-1,3-propanediol: 0.30% by mass
Ion-exchange water: balance (total: 100% by mass)

Comparative Example 14

An ink composition having the following formulation was prepared by a routine method and then filtrated through a membrane filter having an average pore size of 0.8 μm, to thereby prepare a black ink of Comparative Example 14.
[Materials of Ink and Amounts Thereof]
Black pigment dispersion liquid of Preparation Example 1 (pigment concentration: 20% by mass): 20.00% by mass
1,5-Pentanediol: 22.50% by mass
Glycerin: 7.50% by mass
2-Pyrrolidone: 2.00% by mass
2-Ethyl-1,3-hexanediol: 2.00% by mass
CAPSTONE FS-3100 (product of DuPont Co.): 0.03% by mass
PROXEL LV (product of Avecia Biotechnology Inc., 1,2-benzisothiazolin-3-one, a fungicide): 0.20% by mass
2-Amino-2-ethyl-1,3-propanediol: 0.50% by mass
Ion-exchange water: balance (total: 100% by mass)

Next, each of the prepared inkjet recording inks was evaluated for various properties in the following manner. The results are shown in Table 1.
<Evaluation of Color Developing Property: Saturation>
Using an inkjet printer (IPSIO GXe3300, product of Ricoh Company, Ltd.), printing was performed on sheets of MY PAPER (product of Ricoh Company, Ltd.). A printing pattern employed was printing each of the yellow inkjet recording ink, the magenta inkjet recording ink, and the cyan inkjet recording ink at 100% duty. Printing conditions set were 360 dpi and one-pass printing.

After printing and drying, the monochrome solid image portion of yellow, magenta, or cyan was subjected to measurement by a reflection-type color spectroscopic densitometer (product of X-Rite Co.). The measurements were used to obtain coordinates in the L*a*b* color specification system as a color difference display method defined by CIE, and saturation C* in each color was obtained. The higher the saturation, the better the color developing property of the ink can be. Note that, saturation C* is defined by the following formula: $C^* = [(a^*)^2 + (b^*)^2]^{1/2}$.
<Evaluation of Beading>
Using an inkjet printer (IPSIO GXe3300, product of Ricoh Company, Ltd.), printing was performed on sheets of RICOH BUSINESS COAT GROSS 100 (product of Ricoh Company, Ltd.). A printing pattern employed was printing each of the black inkjet recording ink, the yellow inkjet recording ink, the magenta inkjet recording ink, and the cyan inkjet recording ink at 100% duty.

After printing and drying, an extent of beading was visually observed in each of the colors, and evaluated according to the following evaluation criteria.

[Evaluation Criteria]
AA: Non-uniformities were not observed in the printed surface, and the solid portion was uniform.
A: Non-uniformities were slightly observed but were not noticeable much.
B: Small non-uniformities were observed in the solid portion.
C: Large non-uniformities were observed in the solid portion.
<Image Density>
Using an inkjet printer (IPSIO GXe3300, product of Ricoh Company, Ltd.), printing was performed on sheets of MY PAPER (product of Ricoh Company, Ltd.). A printing pattern employed was printing each of the black inkjet recording ink, the yellow inkjet recording ink, the magenta inkjet recording ink, and the cyan inkjet recording ink at 100% duty. Printing conditions set were 360 dpi and one-pass printing.

After printing and drying, the monochrome solid image portion of black, yellow, magenta, or cyan was subjected to measurement by a reflection-type color spectroscopic densitometer (product of X-Rite Co.). The measurements were evaluated according to the following evaluation criteria.
[Evaluation Criteria]

| A: | Black: | 1.25 or more |
| | Yellow: | 0.85 or more |
| | Magenta: | 1.05 or more, or |
| | Cyan: | 1.05 or more |
| B: | Black: | 1.2 or more but less than 1.25 |
| | Yellow: | 0.8 or more but less than 0.85 |
| | Magenta: | 1.0 or more but less than 1.05, or |
| | Cyan: | 1.0 or more but less than 1.05 |
| C: | Black: | 1.15 or more but less than 1.2 |
| | Yellow: | 0.75 or more but less than 0.8 |
| | Magenta: | 0.95 or more but less than 1.0, or |
| | Cyan: | 0.95 or more but less than 1.0 |
| D: | Black: | less than 1.15 |
| | Yellow: | less than 0.75 |
| | Magenta: | less than 0.95, or |
| | Cyan: | less than 0.95 |

<Defoaming Property>
Under an environment of 25° C., 10 mL of each of the prepared inkjet recording inks was added to a 100 mL measuring cylinder. Next, air was injected into the measuring cylinder at a constant pressure until the total volume of the inkjet recording ink and generated foam reached 100 mL. Then, the time required that all the foam disappeared was measured as a defoaming time, which was evaluated according to the following evaluation criteria.
[Evaluation Criteria]
A: The defoaming time was less than 150 seconds.
B: The defoaming time was 150 seconds or more but less than 300 seconds.
C: The defoaming time was 300 seconds or more but less than 600 seconds.
D: The defoaming time was more than 600 seconds.
<Evaluation of Storage Stability>
Using RE-550L (product of TOKI SANGYO CO., LTD., cone 1° 3'×R24), a viscosity (25° C.) of each inkjet recording ink before storage and a viscosity (25° C.) of each inkjet recording ink after storage in a sealed container at 70° C. for 14 days were measured and used to obtain storage stability from the following formula, and the obtained storage stability was evaluated according to the following criteria.

Storage stability (%)=(viscosity after storage/viscosity before storage)×100

[Evaluation Criteria]

A: The storage stability was 95% or more but 105% or less.

B: The storage stability was 100%±5% (exclusive) to 100%±10% (exclusive).

C: The storage stability was 90% or less or 110% or more.

TABLE 1

|  | Saturation C* | Beading Rank | Image density Rank | Defoaming property Rank | Storage stability Rank |
|---|---|---|---|---|---|
| Ex. 1 | 49.23 | B | A | A | A |
| Ex. 2 | 50.23 | A | A | A | A |
| Ex. 3 | 50.33 | A | A | A | A |
| Ex. 4 | 50.76 | AA | B | B | B |
| Ex. 5 | 58.58 | B | A | A | A |
| Ex. 6 | 59.32 | A | A | A | B |
| Ex. 7 | 59.83 | AA | B | A | B |
| Ex. 8 | 59.13 | A | A | A | A |
| Ex. 9 | 82.78 | A | A | A | A |
| Ex. 10 | 82.96 | AA | B | A | B |
| Ex. 11 | 82.05 | A | A | A | A |
| Ex. 12 | — | A | A | C | B |
| Ex. 13 | — | AA | A | A | B |
| Ex. 14 | — | A | A | B | A |
| Ex. 15 | 58.62 | B | C | A | A |
| Ex. 16 | 57.68 | B | C | A | B |
| Ex. 17 | 57.92 | B | B | A | B |
| Ex. 18 | 49.53 | B | B | B | A |
| Ex. 19 | 50.36 | A | A | A | A |
| Ex. 20 | 59.34 | A | A | A | A |
| Ex. 21 | 82.94 | AA | A | A | A |
| Ex. 22 | 58.16 | A | A | B | B |
| Comp. Ex. 1 | 50.31 | B | C | D | A |
| Comp. Ex. 2 | 48.26 | C | C | D | B |
| Comp. Ex. 3 | 48.56 | C | C | D | B |
| Comp. Ex. 4 | 57.09 | C | D | D | A |
| Comp. Ex. 5 | 57.53 | C | C | D | A |
| Comp. Ex. 6 | 57.43 | C | C | C | B |
| Comp. Ex. 7 | 79.25 | C | C | D | A |
| Comp. Ex. 8 | 81.96 | A | B | C | A |
| Comp. Ex. 9 | 79.52 | C | C | D | B |
| Comp. Ex. 10 | — | A | C | D | A |
| Comp. Ex. 11 | — | B | C | D | B |
| Comp. Ex. 12 | — | B | C | D | C |
| Comp. Ex. 13 | 81.92 | C | A | C | A |
| Comp. Ex. 14 | — | B | A | C | A |

The results of Table 1 indicate that Examples 1 to 22 are superior to Comparative Examples 1 to 14 in saturation and beading, being able to give the intended image density.

It is also found that as the amount of the compound containing a group expressed by Structural Formula (1) increases, the image properties become better but the storage stability somewhat decreases.

In addition, a small amount of the defoamer added was found to result in a slight drop of the defoaming property Next, whether each of the defoamers used in Examples 1 to 22 is the defoamer used in the present invention was evaluated as follows.

The results are shown in Table 2.

<Evaluation of Defoamer>

An aqueous solution containing 0.5% by mass of each of the defoamers used in Examples 1 to 22 as an evaluation sample, 1% by mass of a surfactant (CAPSTONE FS-30, product of DuPont Co.), 10% by mass of 1,3-butanediol, 10% by mass of glycerin, 2% by mass of octanediol, and water as balance (total: 100% by mass) were prepared. Next, 10 g of the aqueous solution was added to a 100 mL measuring cylinder. Air was sprayed to the aqueous solution to bubble it until generated foam reaches a height of 100 mL in the measuring cylinder. Then, the resultant was left to stand. In the case where the generated foam disappeared within 600 seconds, it was judged that the evaluation sample was the defoamer. In the case where the generated foam remained for over 600 seconds, it was judged that the evaluation sample was not the defoamer.

TABLE 2

| | | Defoamer | | |
|---|---|---|---|---|
| | | Ex. No. | Kind | Time required for foam disappeared | About whether it was the defoamer |
| Defoamer | Silicone defoamer | Exs. 1, 18 | SH5500 | 60 sec | It was the defoamer. |
| | | Exs. 2, 5, 10, 12 | KM-72F | 30 sec | It was the defoamer. |
| | | Exs. 3, 7, 9, 14, 19, 21 | KM-98 | 30 sec | It was the defoamer. |
| | | Exs. 4, 8, 15, 16, 17 | SM5571 | 60 sec | It was the defoamer. |
| | | Exs. 6, 11, 13, 20 | SM5512 | 60 sec | It was the defoamer. |
| | Non-silicone defoamer | Ex. 22 | BYK-1790 | 250 sec | It was the defoamer. |

Embodiments of the present invention are as follows, for example.

<1> An inkjet recording ink, including:
water;
a water-soluble organic solvent;
a colorant;
a compound containing a group expressed by the following Structural Formula (1), and
a defoamer, $$C_6F_{13}-CH_2CH_2- \quad \text{Structural Formula (1).}$$

<2> The inkjet recording ink according to <1>, wherein the compound containing a group expressed by the Structural Formula (1) is a compound represented by the following General Formula (1);

$$C_6F_{13}-CH_2CH_2O(CH_2CH_2O)_nH \quad \text{General Formula (1),}$$

where n is a natural number of 1 to 40.

<3> The inkjet recording ink according to <1> or <2>, wherein an amount of the compound containing a group expressed by the Structural Formula (1) in the inkjet recording ink is 0.04% by mass to 1.5% by mass.

<4> The inkjet recording ink according to any one of claims <1> to <3>, wherein the defoamer is a silicone defoamer.

<5> The inkjet recording ink according to any one of claims <1> to <4>, wherein an amount of the defoamer in the inkjet recording ink is 0.03% by mass to 0.6% by mass.

<6> The inkjet recording ink according to any one of claims <1> to <5>, wherein the inkjet recording ink is at least one selected from the group consisting of a cyan ink, a magenta ink, a yellow ink, and a black ink.

<7> An ink cartridge, including;
the inkjet recording ink according to any one of <1> to <6>; and
a container, which houses the inkjet recording ink.

<8> An inkjet recording method, including;
applying a stimulus to the inkjet recording ink according to any one of <1> to <6> to make the inkjet recording ink jet, to thereby record an image.

<9> An inkjet recording apparatus, including:
an ink jetting unit configured to apply a stimulus to the inkjet recording ink according to any one of <1> to <6> to make the inkjet recording ink jet, to thereby record an image.

REFERENCE SIGNS LIST

134 Recording head
200 Ink cartridge

The invention claimed is:

1. An inkjet recording ink, comprising:
water;
a water-soluble organic solvent;
a colorant;
0.03% by mass to 0.6% by mass, based on a total mass of the inkjet recording ink, of a defoamer; and
a compound comprising a group expressed by Structural Formula (1):

$$C_6F_{13}-CH_2CH_2- \quad \text{Structural Formula (1).}$$

2. The inkjet recording ink according to claim 1, wherein the compound comprising a group expressed by Structural Formula (1) is a compound represented by General Formula (1):

$$C_6F_{13}-CH_2CH_2O(CH_2CH_2O)_nH \quad \text{General Formula (1),}$$

where n is a natural number ranging from 1 to 40.

3. The inkjet recording ink according to claim 1, wherein an amount of the compound comprising a group expressed by Structural Formula (1) in the inkjet recording ink is 0.04% by mass to 1.5% by mass based on the total mass of the inkjet recording ink.

4. The inkjet recording ink according to claim 1, wherein the defoamer is a silicone defoamer.

5. The inkjet recording ink according to claim 1, wherein the amount of the defoamer in the inkjet recording ink is 0.05% by mass to 0.5% by mass.

6. The inkjet recording ink according to claim 1, wherein the inkjet recording ink is a cyan ink, a magenta ink, a yellow ink, or a black ink.

7. An ink cartridge, comprising:
the inkjet recording ink according to claim 1; and
a container, which houses the inkjet recording ink.

8. The inkjet recording ink according to claim 1, comprising:
10% by mass to 50% by mass, based on the total mass of the inkjet recording ink, of said water-soluble organic solvent;
2% by mass to 15% by mass, based on the total mass of the inkjet recording ink, of said colorant; and
0.04% by mass to 1.5% by mass based on the total mass of the inkjet recording ink, of said compound comprising a group expressed by Structural Formula (1).

9. The inkjet recording ink according to claim 8, wherein the compound comprising a group expressed by Structural Formula (1) is a compound represented by General Formula (1):

$$C_6F_{13}-CH_2CH_2O(CH_2CH_2O)_nH \quad \text{General Formula (1),}$$

where n is a natural number ranging from 1 to 40.

10. The inkjet recording ink according to claim 2, wherein n is a natural number ranging from 5 to 30.

11. The inkjet recording ink according to claim 9, wherein n is a natural number ranging from 5 to 30.

12. The inkjet recording ink according to claim 8, wherein the defoamer is a silicone defoamer.

13. The inkjet recording ink according to claim 9, wherein the defoamer is a silicone defoamer.

14. A method for inkjet recording, comprising:
applying a stimulus to an inkjet recording ink to make the inkjet recording ink jet to thereby record an image,
wherein the inkjet recording ink comprises:
water;
a water-soluble organic solvent;
a colorant;
0.03% by mass to 0.6% by mass, based on a total mass of the inkjet recording ink, of a defoamer; and
a compound comprising a group expressed by Structural Formula (1):

$$C_6F_{13}-CH_2CH_2- \quad \text{Structural Formula (1).}$$

15. An inkjet recording apparatus, comprising:
an ink jetting unit configured to apply a stimulus to an inkjet recording ink to make the inkjet recording ink jet to thereby record an image,
wherein the inkjet recording ink comprises:
water;
a water-soluble organic solvent;
a colorant;
0.03% by mass to 0.6% by mass, based on a total mass of the inkjet recording ink, of a defoamer; and a compound comprising a group expressed by Structural Formula (1):

$C_6F_{13}$—$CH_2CH_2$—      Structural Formula (1).

* * * * *